US011485657B2

(12) United States Patent
Black et al.

(10) Patent No.: US 11,485,657 B2
(45) Date of Patent: Nov. 1, 2022

(54) BIOLOGICAL REMEDIATION OF GROUNDWATER USING AN ALGAL PHOTOBIOREACTOR SYSTEM

(71) Applicant: NUTECH VENTURES, Lincoln, NE (US)

(72) Inventors: Paul N. Black, Lincoln, NE (US); James W. Allen, Lincoln, NE (US); Timothy J. Nicodemus, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 0 days.

(21) Appl. No.: 17/089,472

(22) Filed: Nov. 4, 2020

(65) Prior Publication Data

US 2021/0130206 A1    May 6, 2021

Related U.S. Application Data

(60) Provisional application No. 62/941,347, filed on Nov. 27, 2019, provisional application No. 62/931,056, filed on Nov. 5, 2019.

(51) Int. Cl.
*C02F 3/32* (2006.01)
*C02F 3/10* (2006.01)
(Continued)

(52) U.S. Cl.
CPC ............... *C02F 3/322* (2013.01); *C02F 1/30* (2013.01); *C02F 3/103* (2013.01);
(Continued)

(58) Field of Classification Search
CPC .. C02F 3/322; C02F 1/30; C02F 3/103; C02F 2101/105; C02F 2101/163;
(Continued)

(56) References Cited

U.S. PATENT DOCUMENTS 6,699,389 B1    3/2004    Jöchle et al.
8,101,080 B2    1/2012    Robinson et al.
(Continued)

FOREIGN PATENT DOCUMENTS

CN    101139559 A    3/2008
DE    1103124 A1    8/1992
WO    2017180650 A1    10/2017

OTHER PUBLICATIONS

Logan Christenson, Algal Biofilm Production and Harvesting System for Wastewater Treatment with Biofuels By-Products, Utah State University Graduate Theses and Dissertations, 2011 [online]. [Retrieved on Feb. 27, 2021]. Retrieved from the internet: Especially p. 67, para 5.

(Continued)

*Primary Examiner* — Fred Prince
(74) *Attorney, Agent, or Firm* — Suiter Swantz pc llo

(57) ABSTRACT

A method and system for reducing the concentration of nitrogen-bound nitrate from at least one of groundwater, surface water, or waste water is disclosed. The system includes an algal photobioreactor system. The photobioreactor includes a transparent tubular structure, a medium disposed inside the transparent tubular structure, and alga configured to adhere to the medium. The photobioreactor further includes a pump, and a light source. The method includes providing contaminant-containing water, adding the water to the algal photobioreactor system, adjusting at least one of temperature, ion concentration, $CO_2$ concentration, pH, light wavelength, ion concentration or light intensity in the algal photobioreactor system to enhance growth of algae, removing water from the algal photobioreactor system, and harvesting the algal biomass. A system and method are also disclosed for reducing the concentration of (Continued)

organophosphates from water via an organophosphate-removing alga.

18 Claims, 32 Drawing Sheets

(51) Int. Cl.
*C02F 1/30* (2006.01)
*C02F 101/16* (2006.01)
*C02F 101/10* (2006.01)
*C02F 103/00* (2006.01)
*C02F 103/06* (2006.01)

(52) U.S. Cl.
CPC .. *C02F 2101/105* (2013.01); *C02F 2101/163* (2013.01); *C02F 2103/007* (2013.01); *C02F 2103/06* (2013.01); *C02F 2209/02* (2013.01); *C02F 2209/06* (2013.01); *Y02W 10/10* (2015.05)

(58) Field of Classification Search
CPC ............ C02F 2103/007; C02F 2103/06; C02F 2209/02; C02F 2209/06; Y02W 10/10
USPC ................................. 210/602, 259, 903, 906
See application file for complete search history.

(56) References Cited

U.S. PATENT DOCUMENTS

| | | | |
|---|---|---|---|
| 8,642,273 B2 | 2/2014 | Taylor et al. | |
| 10,174,296 B2 | 1/2019 | Shaw, IV et al. | |
| 2008/0178739 A1* | 7/2008 | Lewnard | C12M 21/02 435/257.1 |
| 2012/0284165 A1* | 11/2012 | Morgenthaler | C02F 3/32 705/37 |
| 2013/0126425 A1 | 5/2013 | McGowan et al. | |
| 2014/0342443 A1* | 11/2014 | Bohn | C12M 39/00 435/292.1 |
| 2019/0119615 A1 | 4/2019 | Gross et al. | |
| 2019/0144320 A1* | 5/2019 | Nilsen | C12M 45/06 210/603 |
| 2019/0241847 A1* | 8/2019 | Krivov | C12M 33/00 |
| 2020/0148568 A1 | 5/2020 | Black et al. | |

OTHER PUBLICATIONS

PCT International Search Report and Written Opinion for International Application No. PCT/US2020/59021 dated Mar. 12, 2021, 11 pages.

Cáceres, T. P. et al., "Biodegradation of the Pesticide Fenamiphos by Ten Different Species of Green Algae and Cyanobacteria", Curr Microbiol. Dec. 2008, 57(6):643-6, doi: 10.1007/s00284-008-9293-7, Published Oct. 16, 2008, 4 pages.

Christenson, L. B. et al., "Rotating algal biofilm reactor and spool harvester for wastewater treatment with biofuels byproducts", Biotechnol Bioeng Jul. 2012, 109(7):1674-84, doi: 10.1002/bit.24451, Published Jan. 27, 2012, 12 pages.

McLellan, James et al., "Feasibility of Using Bacterial-Microalgal Consortium for the Bioremediation of Organic Pesticides: Application Constraints and Future Prospects", Application of Microalgae in Wastewater Treatment 2019 ISBN : 978-3-030-13912-4, Published May 24, 2019, 442 pages.

Nicodemus, Timothy et al., "Reactive Oxygen Species (ROS) mediated degradation of organophosphate pesticides by the green microalgae *Coccomyxa subellipsoidea*", Bioresource Technology Reports 11 (2020) 100461, 10.1016/jbiteb, 7 pages.

* cited by examiner

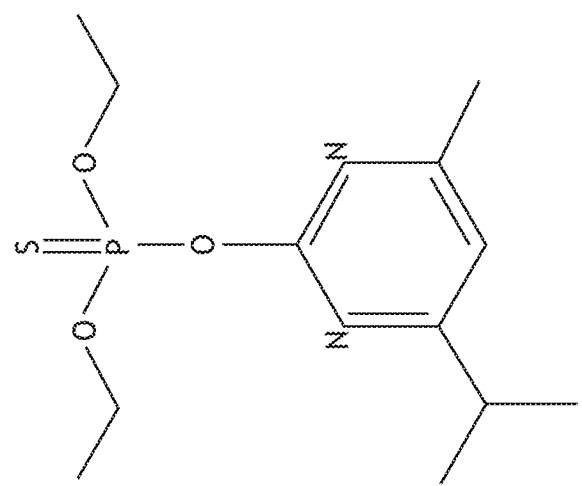
FIG. 10F Diazinon
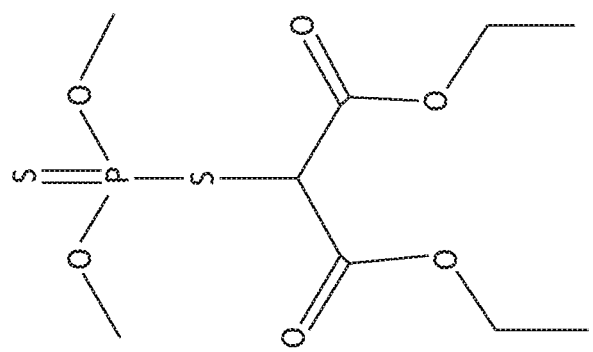
FIG. 10E Malathion
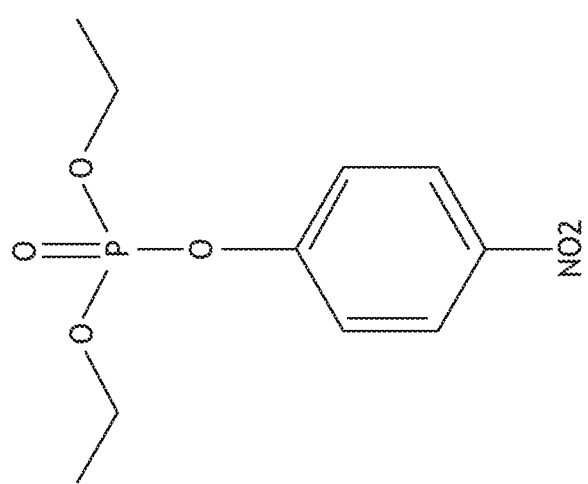
FIG. 10D Paraoxon

BIOLOGICAL REMEDIATION OF GROUNDWATER USING AN ALGAL PHOTOBIOREACTOR SYSTEM

CROSS-REFERENCE TO RELATED APPLICATIONS

The present application claims the benefit under 35 U.S.C. § 119(e) of U.S. Provisional Application Ser. No. 62/931,056, filed Nov. 5, 2019, entitled BIOLOGICAL REMEDIATION OF GROUNDWATER NITRATE-BOUND NITROGEN USING AN ALGAL PHOTOBIOREACTOR SYSTEM, naming Paul N. Black and James W. Allen as inventors, and Provisional Application Ser. No. 62/941,347, filed Nov. 27, 2019, entitled DEGRADATION OF ORGANOPHOSPHATE COMPOUNDS BY ALGAE, naming Paul N. Black and Timothy J. Nicodemus as inventors, which are hereby incorporated by reference in its entirety.

TECHNICAL FIELD

The present invention generally relates to bioremediation, and in particular to the remediation of nitrate-bound nitrogen contaminated water and/or organophosphate contaminated water.

BACKGROUND

Many sources of water throughout the world are affected by contamination of substances harmful to human health. Nitrate-bound nitrogen is a particularly common contaminant in agriculture-intensive areas, where nitrogen from fertilizers enter both surface and ground water. Treatment of contaminated water by biological entities (e.g., bacteria, algae, and fungi) is an emerging technology in wastewater, groundwater, and surface water treatment systems. These biological entities accumulate contaminants, often metabolizing them and incorporating the metabolized compounds into cellular components (e.g., proteins, nucleic acids and lipids). Algae is commonly proposed as the organism in bioremediation systems. Algae is photosynthetic and can survive in minimal media conditions while accumulating contaminants. (e.g., nitrogenous and phosphorous compounds).

Algal water-remediation systems are hampered by several issues that limit large scale and commercial use of these systems. Algal remediation systems may require considerable staffing for monitoring the system and controlling the conditions for algal growth. Specifically, algal harvesting systems linked to remediation often require considerable energy inputs (e.g., centrifugation to remove the algae). The production of algal biomass, a potential source of income to offset operational costs, has yet to be optimized. One component of algal biomass and source for income, triglycerides (TAG), naturally accumulate in most green algae in response to abiotic stress, which is accompanied by reduced or slowed growth and reduced biomass.

Other contaminants common to agricultural areas are organophosphate pesticides. Organophosphate pesticides are a class of commonly used pest control compounds with the general structure $O=P(OR)_3$. These compounds target and inhibit the enzyme acetylcholinesterase in a wide variety of insects and other animals, resulting in an interference in nerve activity and potential death. Organophosphate pesticides are heavily used in agriculture, and by weight, comprise nearly half of all pesticides used in the world.

Organophosphates pesticides are hazardous to human health, even at low concentrations. People chronically exposed to low concentrations of organophosphates are at risk for nerve- and cancer-related disorders as well as diabetes. Pregnant women and children are especially susceptible to organophosphates, as the compounds negatively affect brain development in young children and the developing fetus.

Organophosphate pesticides are also hazardous to other off-target animals. Birds and beneficial insects (e.g., bees) are profoundly sensitive to organophosphate pesticides. These animals are often exposed to organophosphates not only at the point of application (e.g., in the field), but also in places where water running off the field may accumulate, such as in rivers and lakes.

Many lakes and rivers throughout the world are affected by organophosphate contamination. Organophosphate pesticides also bioaccumulate within the food web of water environments, and where they may reach toxic levels in fish, and the animals that feed primarily on fish. Organophosphates are also used at industrial scale for use as fire retardants, anti-foaming agents, and plasticizing agents. Contamination of water sources from these industrial uses have become widespread as well, and the environmental damage from these contaminants is still being assessed. Removal or breakdown of organophosphates from water sources currently require the use of chemicals and/or enzymes. These methods are expensive and are labor intensive.

Therefore, it would be advantageous to provide systems and methods that overcomes the shortcomings described above.

SUMMARY

An algal photobioreactor system is disclosed, in accordance with one or more embodiments of the present disclosure. In one embodiment the system includes a transparent tubular structure. In another embodiment, the system includes a medium disposed inside the transparent tubular structure. In another embodiment, the system includes a pump. The pump is configured to circulate at least one of groundwater, surface water, or waste water through the transparent tubular structure. In another embodiment, the system includes an alga configured to adhere to the medium, wherein the alga is further configured to remove a contaminant from the at least one of the groundwater, the surface water, or the waste water. The alga is configured to adhere to the medium. In another embodiment, the system includes a light source. The contaminant may include nitrogen-bound nitrate or organophosphate.

A method of removing a contaminant from at least one of ground water, surface water, or waste water is disclosed in accordance with one or more embodiments of the present disclosure. In one embodiment, the method includes providing contaminant-containing water from at least one of groundwater, surface water, or waste water sources. In another embodiment, the method includes adding the contaminant-containing water to an algal photobioreactor system. In another embodiment, the method includes adjusting at least one of temperature, $CO_2$ concentration, pH, light wavelength, ion concentration or light intensity in the algal photobioreactor system to enhance growth of algae. In another embodiment, the method includes removing water from the algal photobioreactor system. In another embodiment, the method includes harvesting algal biomass. The contaminant may include nitrogen-bound nitrate or organophosphate.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 10D is an illustration depicting the structure of paraoxon, in accordance with one or more embodiments of the present disclosure.

FIG. 10E is an illustration depicting the structure of malathion, in accordance with one or more embodiments of the present disclosure.

FIG. 10F is an illustration depicting the structure of diazinon, in accordance with one or more embodiments of the present disclosure.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

FIGS. 1-6 generally illustrate an algal photobioreactor system and a method for utilizing an algal bioreactor to reduce the concentration of nitrogen-bound nitrate and/or organophosphate in water, in accordance with one or more embodiments of the present disclosure.

Embodiments of the present disclosure are directed to an algal photobioreactor system. More particularly, embodiments of the present disclosure are directed to an algal photobioreactor system implementing a transparent tubular structure containing a fibrous cord as a medium for algae. The alga removes nitrogen-bound nitrates from the water without the algae itself circulating in the water. Embodiments of the present disclosure further include a method for removing nitrogen-bound nitrates from water using the aforementioned algal photobioreactor system. Embodiments of the present disclosure further include systems and methods for removing organophosphates from water using the aforementioned algal photobioreactor system and/or a photobioreactor system wherein the alga circulates within the water.

Figure 1:
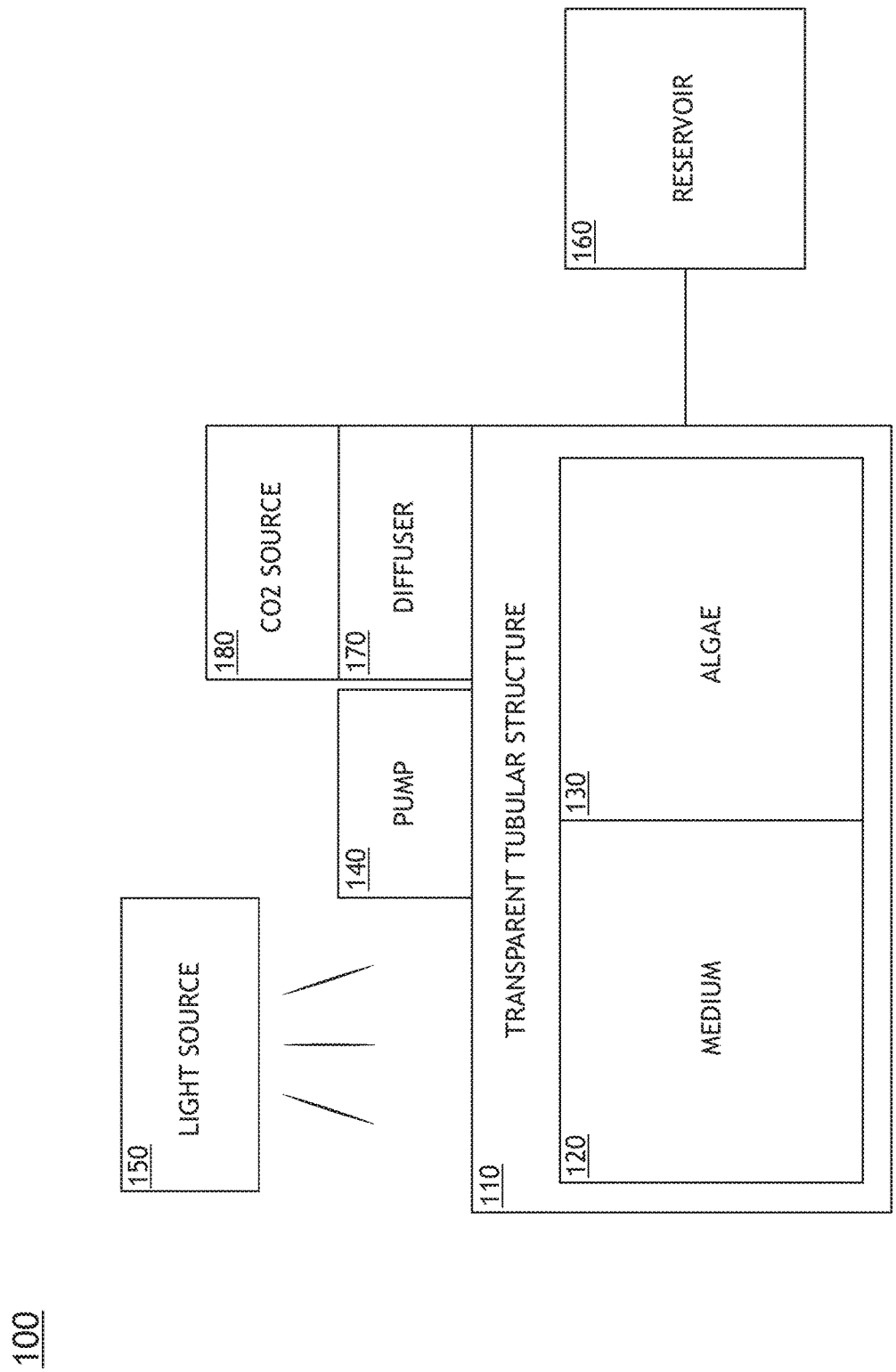
FIG. 1 is a block diagram illustrating an algal photobioreactor system, in accordance with one or more embodiments of the present disclosure.

FIG. 1 is a block diagram illustrating an algal photobioreactor system 100, in accordance with one or more embodiments of this disclosure. In one embodiment, the algal photobioreactor system includes a transparent tubular structure 110. The transparent tubular structure 110 provides a path for the water to circulate through the algal photobioreactor system 100 during the nitrogen-bound nitrate removal process. The transparent tubular structure 110 also allows light to enter into the tube. The transparent tubular structure 110 may be made of any material known in the art that is transparent or translucent and can hold an aqueous solution. For example, the material may be glass (e.g., borosilicate, soda-lime silicate, or quartz). In another example, the transparent tubular structure 110 may be constructed of plastic (e.g., polypropylene, polycarbonate, high-density polyethylene (HDPE), low-density polyethylene (LDPE), or co-polyester). In still another example, the transparent tubular structure 110 may be constructed of recycled materials (e.g., plastic water bottles).

The transparent tubular structure 110 may be configured to take on any cross-sectional shape capable of supporting an algal culture. For example, the transparent tubular structure 110 may have a circular cross-section. In another example, the transparent tubular structure 110 may have rectangular cross-section. In still another example, the transparent tubular structure 110 may have an ovoid cross-section (e.g., a tube with an oval cross-section).

The transparent tubular structure 110 may be of any cross-sectional width to support the circulation of water through the algal photobioreactor system 100. For example, the transparent tubular structure 110 may have an outer diameter of 65 mm. In another example, the transparent tubular structure 110 may have an outer diameter greater than 65 mm. In another example, the transparent tubular structure 110 may have an outer diameter less than 65 mm. The wall thickness of the transparent tubular structure 110 may be any thickness known in the art. For instance, the thickness of the walls may range from two to three millimeters. For example, the wall thickness of a straight tube within the transparent tubular structure 110 may be approximately 2.2 mm. In another example, the wall thickness of a curved tube within the transparent tubular structure may be approximately 2.8 mm.

The length of the transparent tubular structure 110 may be of any length needed to support an algal photobioreactor system. For example, the length of the transparent tubular structure 110 may be approximately six meters. In another example, the length of the transparent tubular structure 110 may be less than six meters. In another example, the length of the transparent tubular structure 110 may be greater than six meters. For instance, the length of the transparent tubular structure 110 may be approximately 690 meters. In another instance, the length of the tube may be greater than 1000 meters.

Figure 2A:
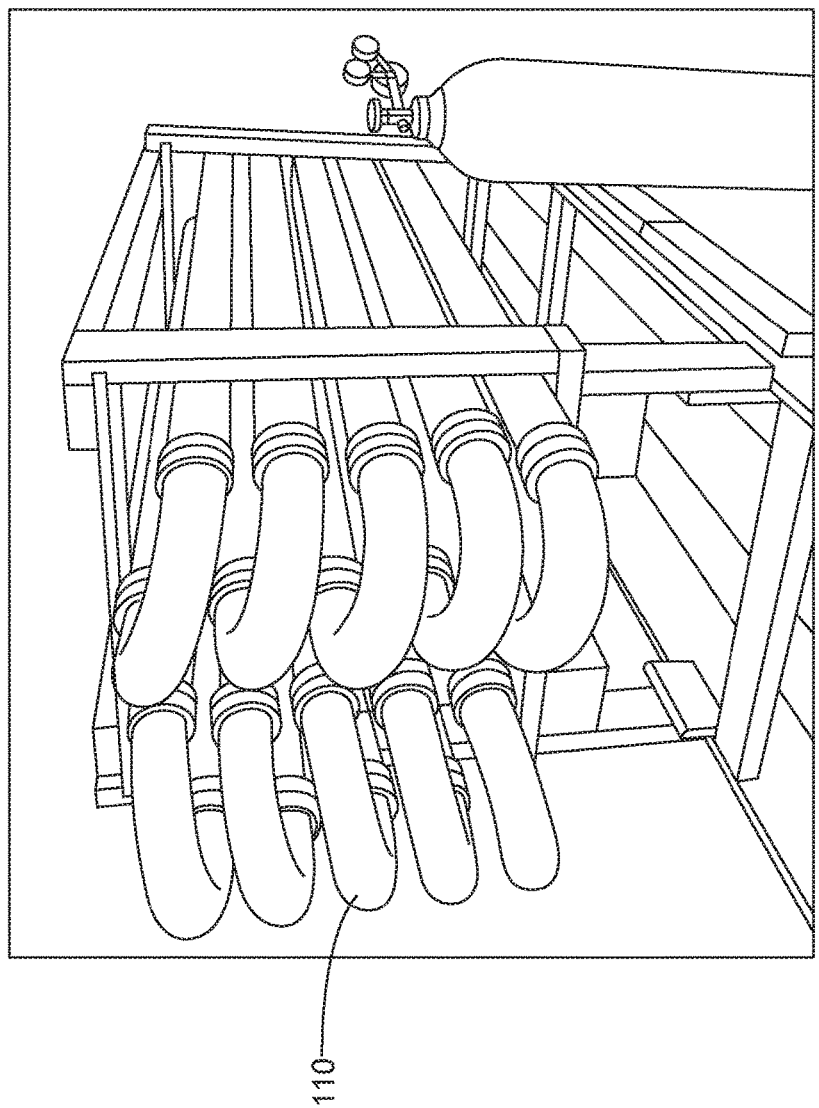
FIG. 2A illustrates the transparent tubular structure of the algal photobioreactor system, in accordance with one or more embodiments of the present disclosure.
Figure 2B:
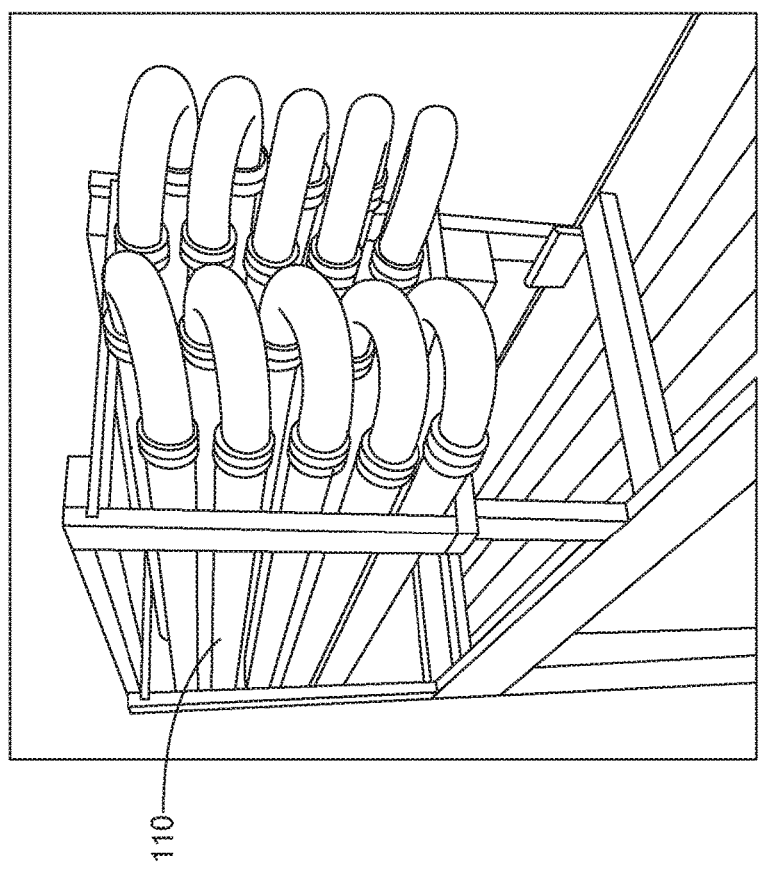
FIG. 2B illustrates the transparent tubular structure of the algal photobioreactor system, in accordance with one or more embodiments of the present disclosure.

The arrangement of the transparent tubular structure 110 may be of any configuration that allows the exposure of the transparent tubular structure 110 to light, while confining the transparent tubular structure to a selected space. The arrangement may include a single formed tube, or may include elbows, or curve pieces, along with straight tubes, to wrap the transparent tubular structure efficiently within the selected space. For example, the arrangement of the transparent tubular structure may take on an accordion, helical, or helix-like arrangement (e.g., as seen in FIG. 2A-2B). In another example, the transparent tubular structure may be arranged in a spiral.

The straight tubes of the transparent tubular structure may be of any length known in the art. For example, the length of the straight tubes may range from one to 10 meters. For instance, the length of the straight tubes may be 2.5 meters. In another example, the length of the straight tube is greater than 10 meters. The number of straight tubes and curved tubes used within the transparent tubular structure 110 is dependent on the overall length and design of the algal photobioreactor system 100.

The flow of water through the transparent tubular structure 110 may be of any flow known in the art. For example, the flow of water through the transparent tubular structure may be 15 $L \cdot min^{-1}$. In another example, the flow of water through the transparent tubular structure may be less than 15 $L \cdot min^{-1}$. In still another example, the flow of water through the transparent tubular structure 110 may be greater than 15 $L \cdot min^{-1}$. For instance, the flow of water through the transparent tubular structure may be greater than 1000 $L \cdot min^{-1}$.

The volume held by the transparent tubular structure 110 is related to the diameter and length of the transparent tubular structure 110 and may be of any volume known in the art. For example, the volume of the transparent tubular structure may be 30 L. In another example, the volume of the tube may be less than 30 L. In still another example, the volume of the transparent tubular structure 110 may be greater than 30 L. For instance, the volume of the transparent tubular structure 110 may be greater than 10,000 L.

In an embodiment, the transparent tubular structure 110 is configured as a continuous loop, allowing the water in the transparent tubular structure 110 to be recirculated over and over. In another embodiment, the transparent tubular structure is configured as a discontinuous line, with at least one input and one output.

In one embodiment, the algal photobioreactor system includes a medium 120 disposed inside the transparent tubular structure 110. The medium 120 is configured to bind to biological entities (e.g., alga or bacteria), allowing the water to flow through the algal photobioreactor system 100 without the biological entities freely mixing within the water.

The medium 120 may include any substance capable of adhering to a biological entity within a photobioreactor. For example, the medium 120 may include natural fibrous material from sources including but not limited to cotton, cellulose, or bamboo. For instance, the medium 120 may include cotton. In another instance, the medium 120 may include wood (e.g., cellulose or wood pulp). In still another instance, the medium may include hemp.

Figure 2C:
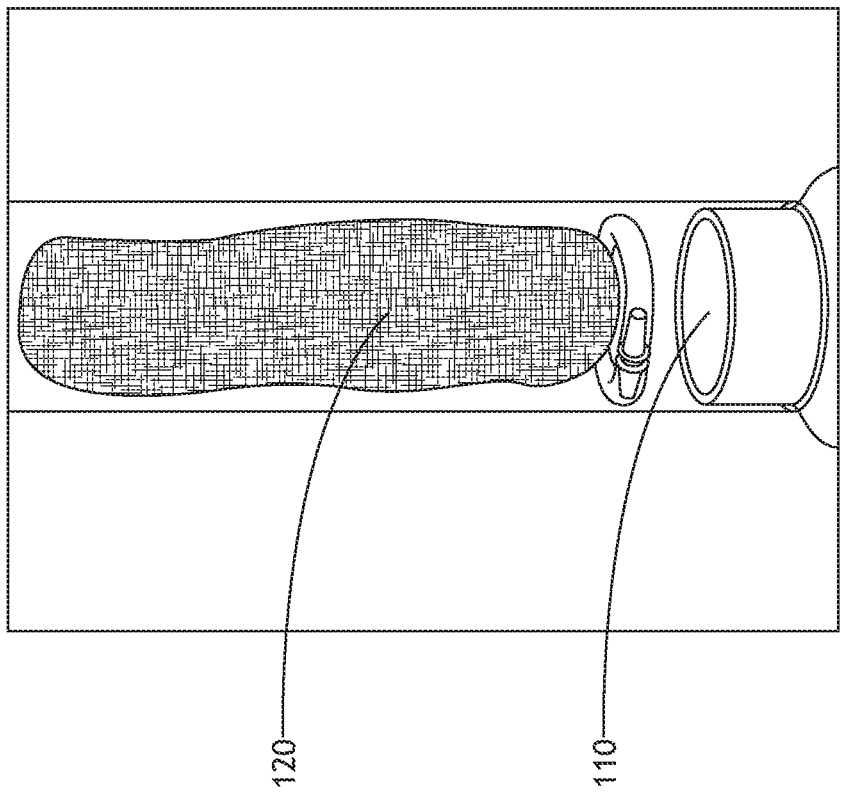
FIG. 2C illustrates a portion of the transparent tubular structure containing a medium, in accordance with one or more embodiments of the present disclosure.
Figure 2D:
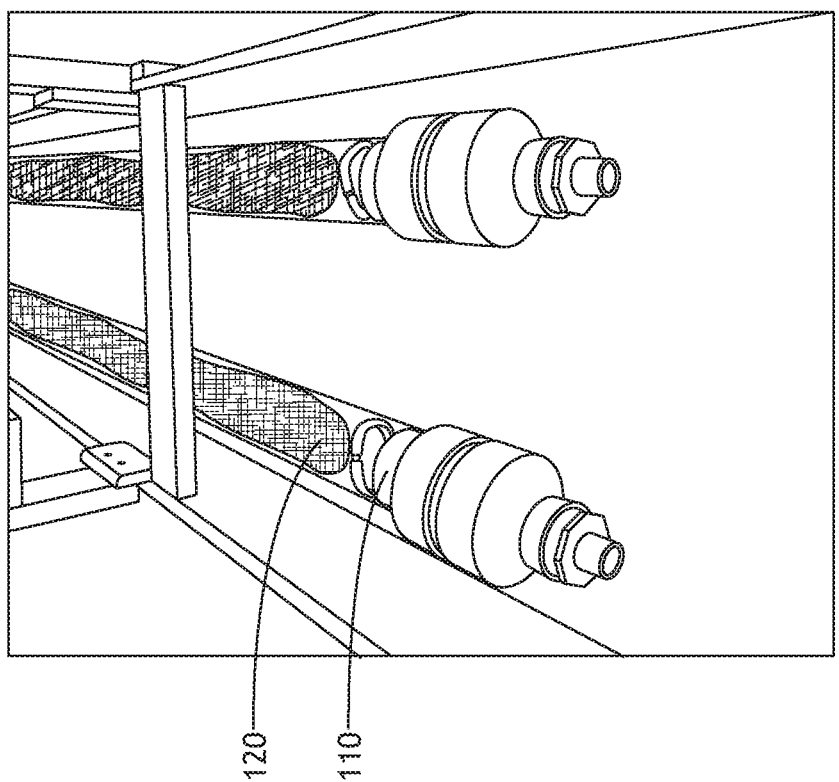
FIG. 2D illustrates portions of the transparent tubular structure containing a medium, in accordance with one or more embodiments of the present disclosure.
Figure 2E:
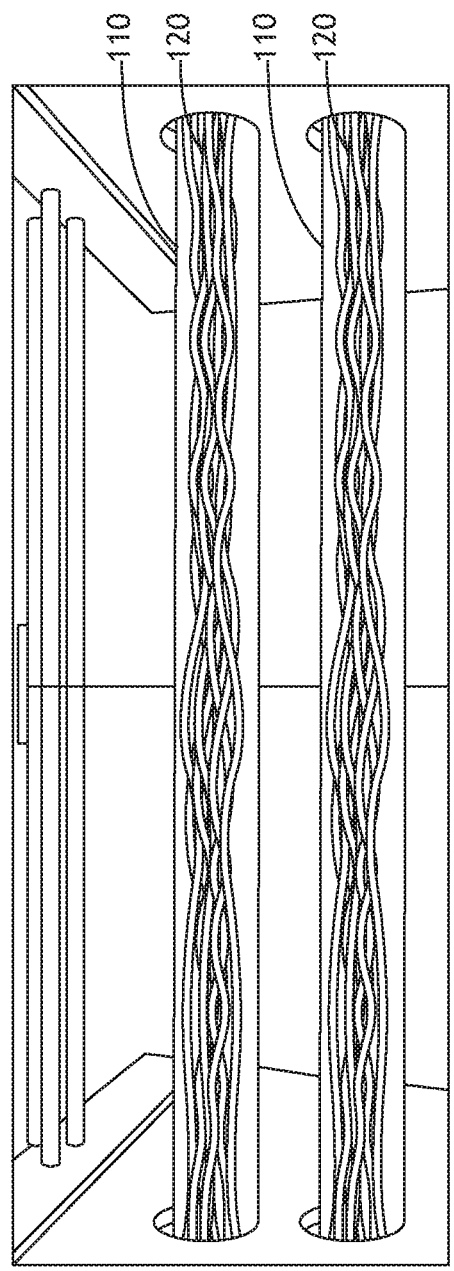
FIG. 2E illustrates a portion of the transparent tubular structure containing a cotton cord medium, in accordance with one or more embodiments of the present disclosure.

In one embodiment, the medium 120 may include manufactured or synthetic materials including but not limited to stainless steel, acrylic, glass, polycarbonate, polystyrene, polyester, polyethylene, glass wool, polyurethane, poly(methyl methacrylate), polyfluoroethylene, and cellulose acetate. For example, the medium 120 may include polyester fibers from a Kimberly-Clark Wypall® dusting system (sku: 83650). Examples of a medium 120 disposed within the transparent tubular structure 110 are seen in FIGS. 2C and 2D.

The medium 120 may be configured to be of any form capable of acting as a medium within the algal photobioreactor system. For example, the medium 120 may take the form of a cord (e.g., cotton cord or cotton rope, as in FIG. 2E). In another example, the medium 120 may take the form of a water permeable matrix. In still another example, the medium 120 may take the form of loosely formed material confined within a mesh.

In one embodiment, the medium 120 is a cotton cord with a diameter of 5.6 mm. The cotton cord may be configured to include cords of different diameters. For example, the cotton cord may have a diameter less than 5.6 mm. In another example, the cotton cord may have a diameter greater than 5.6 mm. The cotton cord may be looped back and forth in the transparent tubular structure 110 to increase the available surface area by the medium 120.

Figure 2F:
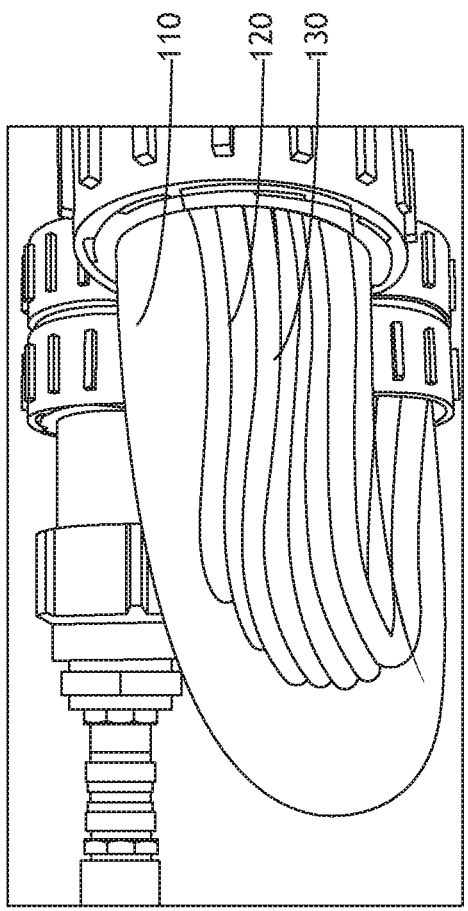
FIG. 2F illustrates the elbow of a glass tube containing cotton cord medium after algal inoculation, in accordance with one or more embodiments of the present disclosure.

In one embodiment, the algal photobioreactor system includes an alga 130. The alga 130 attaches to the medium 120 (e.g., as seen in FIG. 2F), where it absorbs contaminants (e.g., nitrogen-bound nitrate and/or phosphates), ultimately reducing the concentration of the contaminants in water. The alga also creates biomass that may be harvested.

The species of algae 130 used in the algal photobioreactor system may include any species of algae capable of facilitating the uptake of nitrogenous and/or phosphorous compounds. For example, the algae 130 may include, but is not limited to, *Coccomyxa subellipsoidea Tribonema aequale, Bumilleriopsis filiformis, Chlorella vulgaris, Chlorella sorokiniana, Koliella antarctica* or *Tetradesmus obliquus*.

The algae 130 may also include species capable of producing relatively high concentrations of triglycerides (TAG). TAG can be extracted from the algae 130 and converted into an oil that can be used for a variety of purposes (e.g., fuel, plastics). The production of a high TAG-producing algae 130 may provide a non-fossil fuel source of oil and an income stream that may alleviate a portion of the costs of water bioremediation. TAG naturally accumulates in most green algae 130 in response to abiotic stresses, which is accompanied by reduced or slowed growth and reduced biomass. Strains of algae 130 that optimize TAG production concurrent with uptake of contaminants may be used. It should be noted that any algal species with any selected properties for contaminant uptake and/or TAG production may be used in the algal photobioreactor system 100. Therefore, the above description should not be interpreted as a limitation of the present disclosure, but merely as an illustration. Additional embodiments relating to the reduction of nitrogen-bound nitrate or production of TAG in an algal photobioreactor system are described in U.S. patent application Ser. No. 16/653,696, filed Oct. 15, 2019, which is incorporated herein by reference in the entirety.

In another embodiment, the algal photobioreactor system 100 includes one or more pumps 140. The pumps 140 may be configured to circulate water (e.g., within the transparent tubular structure 110). The pumps 140 may be configured to move liquid components of the algal photobioreactor system 100 (e.g., water, media adjusting components) from one component of the algal photobioreactor system 100 to another. The pumps 140 may be of any type of liquid pump known in the art including, but not limited to, dynamic pumps 140 (e.g., centrifugal or submersible pumps) and/or positive displacement pumps 140 (e.g., diaphragm, gear, peristaltic, lobe, and/or piston pumps). For example, the pump 140 may be a centrifugal pump 140 with flexible vanes.

In another embodiment, the algal photobioreactor system 100 includes a light source 150. The light source 150 provides light needed by the photosynthetic algae 130 for growth. In one embodiment, the light source 150 includes a natural light source (e.g., the Sun). In another embodiment, the light source includes an artificial light source (e.g., incandescent, halogen, fluorescent, or light emitting diode (LED)). For example, the light source 150 may be an 85 W RAY44 Anthrospec LED canopy light. In another embodiment, the algal photobioreactor system 100 utilizes both natural and artificial light. For example, the algal photobioreactor system 100 may turn on artificial light during the night or when days are cloudy.

Figure 2G:
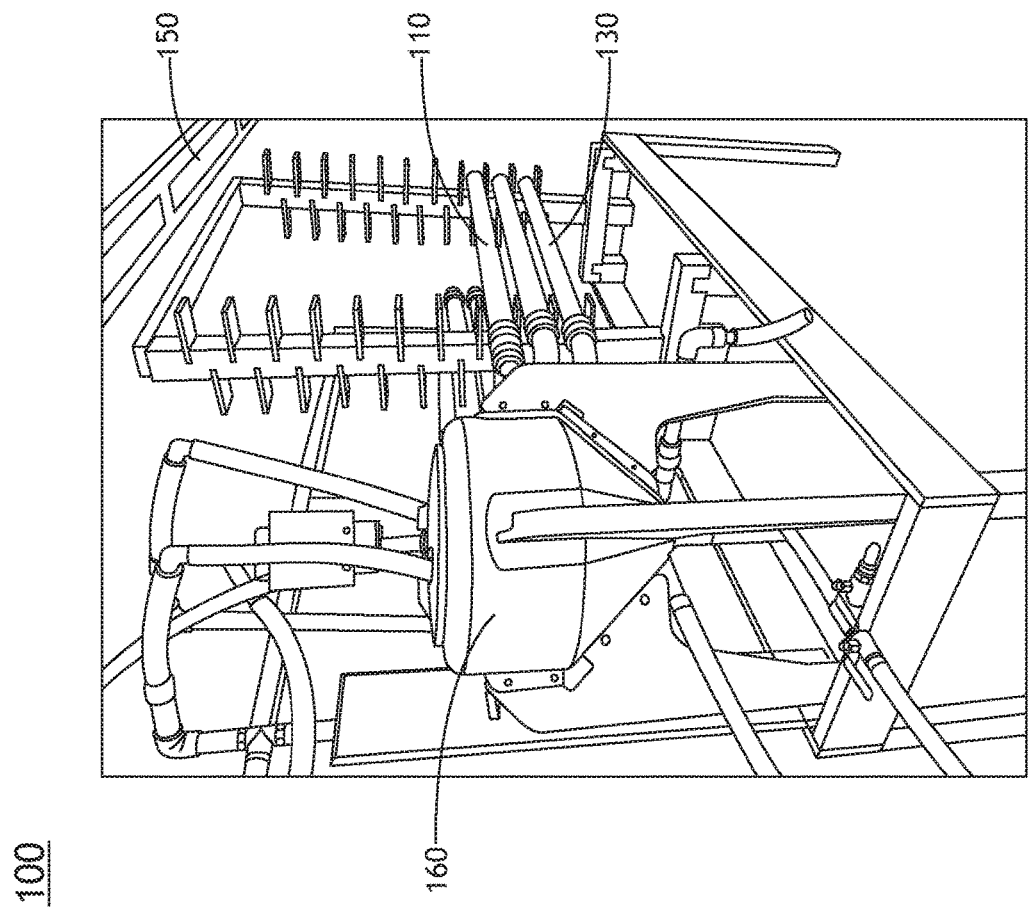
FIG. 2G illustrates an algal photobioreactor system, in accordance with one or more embodiments of the present disclosure.

The light source 150 may be configured to generate light of a selected one or more wavelengths. For example, the light source 150 may be configured to emit any combination of infrared, visible, or ultraviolet light. For example, the light source 150 may include a broadband light source configured to emit light having a wavelength or wavelength range between 400-700 nm (e.g., the white light source 150 in FIG. 2G). For instance, in the case of a broadband light source, the light source 150 is configured to emit light having a wavelength with ranges as follows: 400-500 nm, 400-600 nm, 500-700 nm, or 600-700 nm. In another example, the light source 150 includes a red-light source configured to emit light having a wavelength or wavelength range between 622-780 nm. For instance, in the case of a red light source 150, the red light source 150 is configured to emit light having a wavelength with ranges or values as follows: 622-700 nm, 622-725 nm, 650-700 nm, 650-750 nm, 650-780 nm, 622 nm, 625 nm, 630 nm, 640 nm, 650 nm, 660 nm, 670 nm, 675 nm, 680 nm, 690 nm, 700 nm, 710 nm, 720 nm, 730 nm, 740 nm, 750 nm, 760 nm, 770 nm, or 780 nm. In another example, the light source 150 includes a green light source configured to emit light having a wavelength or wavelength range between 520-610 nm. For instance, in the case of a green light source 150, the green light source 150 is configured to emit light having a wavelength with ranges or values as follows: 520-580 nm, 520-600 nm, 520-550 nm, 550-600 nm, 550-610 nm, 520 nm, 525 nm, 530 nm, 540 nm, 550 nm, 560 nm, 570 nm, 575 nm, 580 nm, 590 nm, 600 nm, 605 nm, or 610 nm. In another example, the light source 150 includes a blue light source configured to emit light having a wavelength or wavelength range between 450-520 nm. For instance, in the case of a blue light source 150, the blue light source 150 is configured to emit light having a wavelength with ranges or values as follows: 400-450 nm, 450-480 nm, 450-470 nm, 460-495 nm, 470-495 nm, 400 nm, 425 nm, 450 nm, 455 nm, 460 nm, 465 nm, 470 nm, 475 nm, 480 nm, 485 nm, 490 nm, 495 nm, or 500 nm. The intensity of the light is preferably about 100-800 $\mu mol/m^2/sec$, with ranges and values such as 100-300 $\mu mol/m^2/sec$, 100-400 $\mu mol/m^2/sec$, 100-500 $\mu mol/m^2/sec$, 100-600 $\mu mol/m^2/sec$, 100-700 $\mu mol/m^2/sec$, 200-400 $\mu mol/m^2/sec$, 200-600 $\mu mol/m^2/sec$, 200-700 $\mu mol/m^2/sec$, 300-500 $\mu mol/m^2/sec$, 300-600 $\mu mol/m^2/sec$, 300-700 $\mu mol/m^2/sec$, 300-800 $\mu mol/m^2/sec$, 400-500 $\mu mol/m^2/sec$, 400-600 $\mu mol/m^2/sec$, 400-700 $\mu mol/m^2/sec$, 400-800 $\mu mol/m^2/sec$, 500-600 $\mu mol/m^2/sec$, 500-700 $\mu mol/m^2/sec$, 500-800 $\mu mol/m^2/sec$, 100 $\mu mol/m^2/sec$, 200 $\mu mol/m^2/sec$, 300 $\mu mol/m^2/sec$, 400 $\mu mol/m^2/sec$, 500 $\mu mol/m^2/sec$, 600 $\mu mol/m^2/sec$, 700 $\mu mol/m^2/sec$, and 800 $\mu mol/m^2/sec$ are envisioned. In one embodiment, the algal photobioreactor system includes one or more reservoirs 160 (e.g., as shown in FIG. 2G). The reservoir 160 stores water that is not flowing through the transparent tubular structure. For example, the reservoir may be physically connected to the transparent tubular structure 110 as part of the loop so that water exiting the transparent tubular structure will flow into and exit the reservoir 160 and will enter into the transparent tubular structure 110. In another example, the reservoir 160 only receives water from the transparent tubular structure 110 after the water has been treated by the algal photobioreactor system 100. In still another example, the transparent tubular structure only receives water from the reservoir 160 (e.g., different reservoirs are used for input or output).

In one embodiment, the algal photobioreactor system 100 includes a diffuser 170. The diffuser 170 aerates the fluid within the transparent tubular structure 110, increasing algal health and growth. The diffuser 170 may use compressed air (e.g., ambient air) and/or compressed $CO_2$.

Figure 2H:
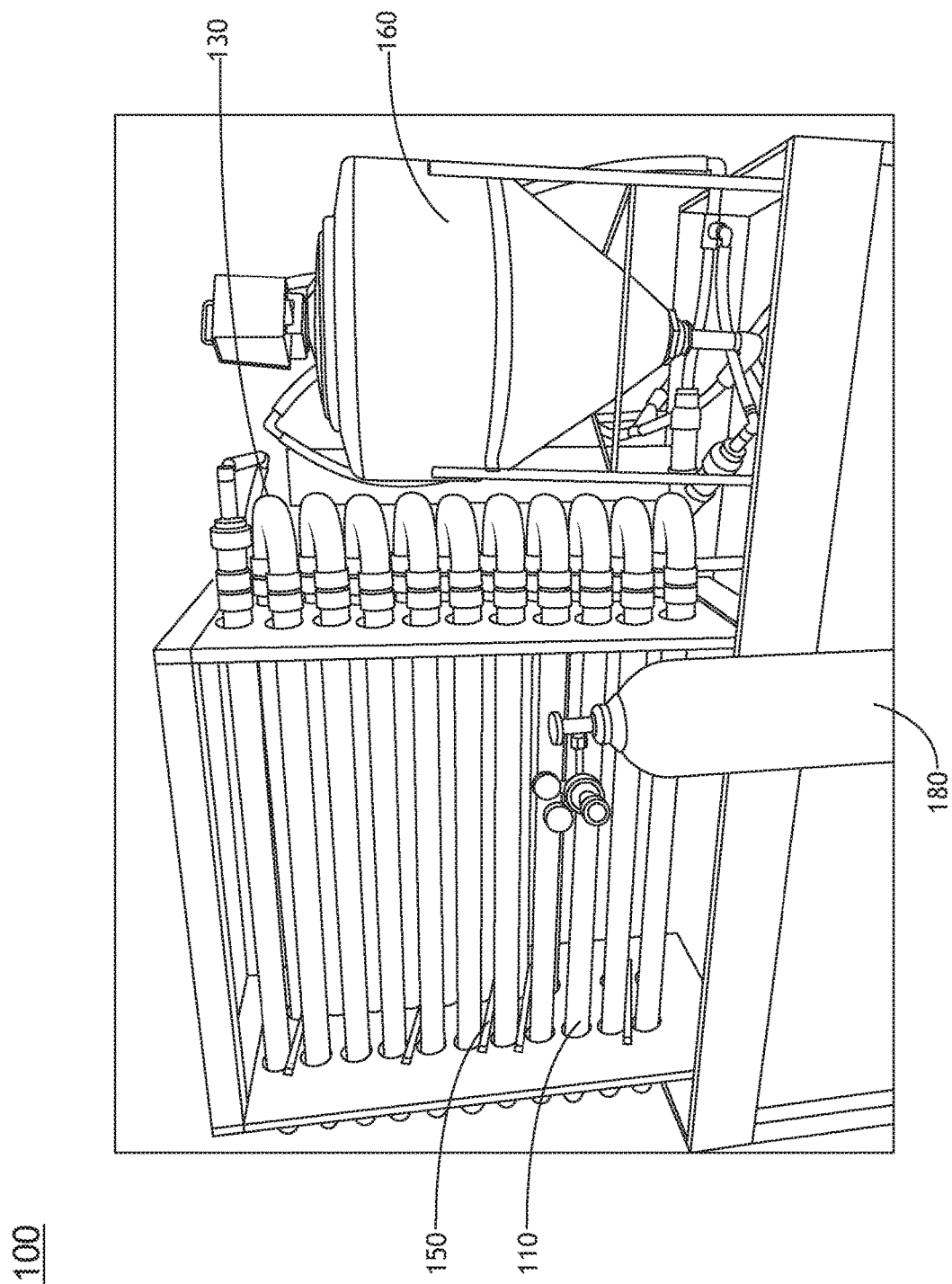
FIG. 2H illustrates an algal photobioreactor system, in accordance with one or more embodiments of the present disclosure.

In one embodiment, the algal photobioreactor system 100 further includes a $CO_2$ source 180. The $CO_2$ source 180 is configured to augment the algal photobioreactor system with $CO_2$, raising the concentration of $CO_2$ within the algal photobioreactor system 100 (e.g., by injection of $CO_2$ into the transparent tubular structure 110). Higher $CO_2$ concentrations are associated with increased biomass production. The intake of $CO_2$ by the algae also reduces the availability of $CO_2$ as a global warming gas. In one embodiment, the $CO_2$ source 180 is a cylinder of compressed carbon dioxide, as shown in FIG. 2H.

Figure 3:
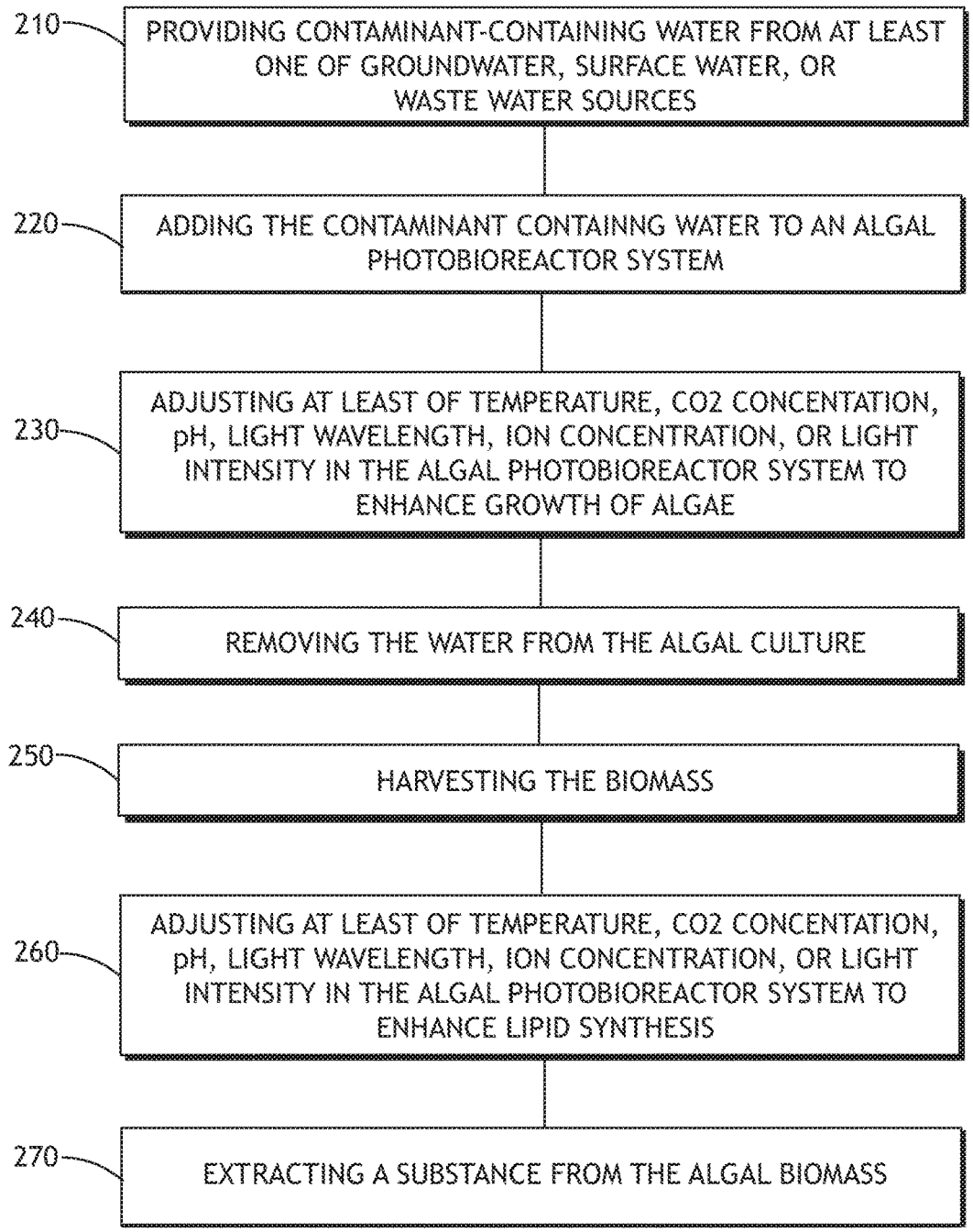
FIG. 3 is a flow diagram illustrating a method for removing contaminants from water using an algal photobioreactor system in accordance with one or more embodiments of the present disclosure.

FIG. 3 illustrates a method 200 for removing nitrogen-bound nitrate from waste water, surface water and/or groundwater, in accordance with one or more embodiments of the present disclosure.

In one embodiment, step 210 of method 200 includes providing contaminant-containing water from groundwater, surface water, or waste water sources. For example, groundwater from a nitrate-contaminated municipal well may be provided for nitrate removal. By way of another example, surface water from a nitrate-contaminated lake may be provided for nitrate removal. By way of another example, waste water from a livestock confinement complex may be provided for nitrate removal. The contaminated water may be stored in a reservoir before processing.

In another embodiment, step 220 of method 200 includes adding contaminant-containing water to an algal photobioreactor system 100. The algal photobioreactor system utilized in the method 200 may include the algal photobioreactor system 100 described previously herein, with a medium 120 that has been coated with algae 130. In another embodiment, the algal photobioreactor system utilized in the method 200 may include algal photobioreactor systems that use different water decontamination strategies (e.g., an external decontamination system (e.g., pond-based) or internal decontamination systems with different algal utilization strategies).

In another embodiment, step 230 of the method 200 includes adjusting at least one of temperature, $CO_2$ concentration, pH, wavelength, or light intensity in the algal photobioreactor system 100 to enhance the growth of algae. The adjustment of one or more of these parameters may be controlled automatically. In another embodiment, one or more of the parameters may be adjusted manually. For example, the temperature of the algal photobioreactor system 100 may be adjusted by manually adjusting a heating/cooling sub-system. In another example, light intensity may be adjusted by manually turning on a light source 150. Adjustments may be made to the algal photobioreactor system at the beginning of the decontamination process (e.g., when the water and algae are first combined), at one or more times during the decontamination process, or continuously during the decontamination process.

In another embodiment, step 240 of the method 200 includes removing the decontaminated water from the algae (e.g., the water is separated from the algae once the contaminants have been lowered to a selected level.) For example, the water removed after the measured concentration of nitrogen bound nitrate is less than 10 ppm. In another example, the water may be released after the measured concentration of nitrogen bound nitrate is less than 1 ppm. The selected level of nitrogen bound nitrogen bound nitrate may be determined by the operator of the algal photobioreactor system 100. The decontaminated water may be released into a reservoir 160, another purification system or subsystem, or into a water supply (e.g., municipal).

In another embodiment, step 250 of the method 200 includes harvesting the algal biomass. In one embodiment, the harvest of the algal biomass is accomplished from the removal of the medium 120, with the attached algae 130, from the algal photobioreactor system 100 (e.g., from the transparent tubular structure 110). For mediums 120 made from natural products (e.g., cotton cord), the algae-coated medium 120 may be harvested as a single biomass. In another embodiment, the algae 130 is removed from the medium 120. The removal of algae from the medium may be performed by any method known in the art. For example, the medium 120 may be run through one or more rollers, wherein the rollers compress the medium, squeezing the algae 130 from the medium 120. In another example, the medium may be forced through an aperture roughly the same size, or slightly smaller, than the cross section of the medium. In another example, the medium 120 may be washed in a small amount of water, releasing the algae 130.

In one embodiment, the medium 120 is reused in the algal photobioreactor system 100 after the removal of algae 130 from the medium. The medium 120 may need to undergo one or more cleaning steps before it is reused (e.g., bleaching, UV treatment or autoclaving).

In one embodiment, the method 200 includes a step 260 of adjusting at least one of temperature, $CO_2$ concentration, pH, light wavelength, ion concentration, or light intensity in the algal photobioreactor system 100 to enhance lipid synthesis. Lipids, which can be refined into oil, are one of the most valuable components that may be extracted from the algal biomass. The sale of lipids or lipid-refined oil may cover a portion of the costs associated with the algal bioreactor. Therefore, the conditions of the algal bioreactor may be altered from those that enhance algal growth to one that enhances lipid formation.

In one embodiment, the method 200 further includes a step 270 of extracting a substance from the algal biomass. The substance extracted from the biomass may include any substance including but not limited to lipids, carbohydrates, proteins, or pigments. The extraction of these components from the algae 130 may occur at or near the algal photobioreactor system 100. The extraction of these components from the algae 130 may occur in another facility (e.g., a chemical processing plant).

In one embodiment, the method 200 is capable of reducing the concentration of nitrogen-bound nitrate in water from over 100 ppm to less than 1 ppm. It should be noted that other nitrogen- and phosphorous-containing compounds may be consumed by the algae 130 for remediation purposes (e.g., nitrites, atrazine, N-nitrosamines, and N-nitroso compounds). Therefore, the above description should not be interpreted as a limitation of the present disclosure, but merely as an illustration.

Example I

Suspension of Alga in Algal Photobioreactor Systems

Figure 4:
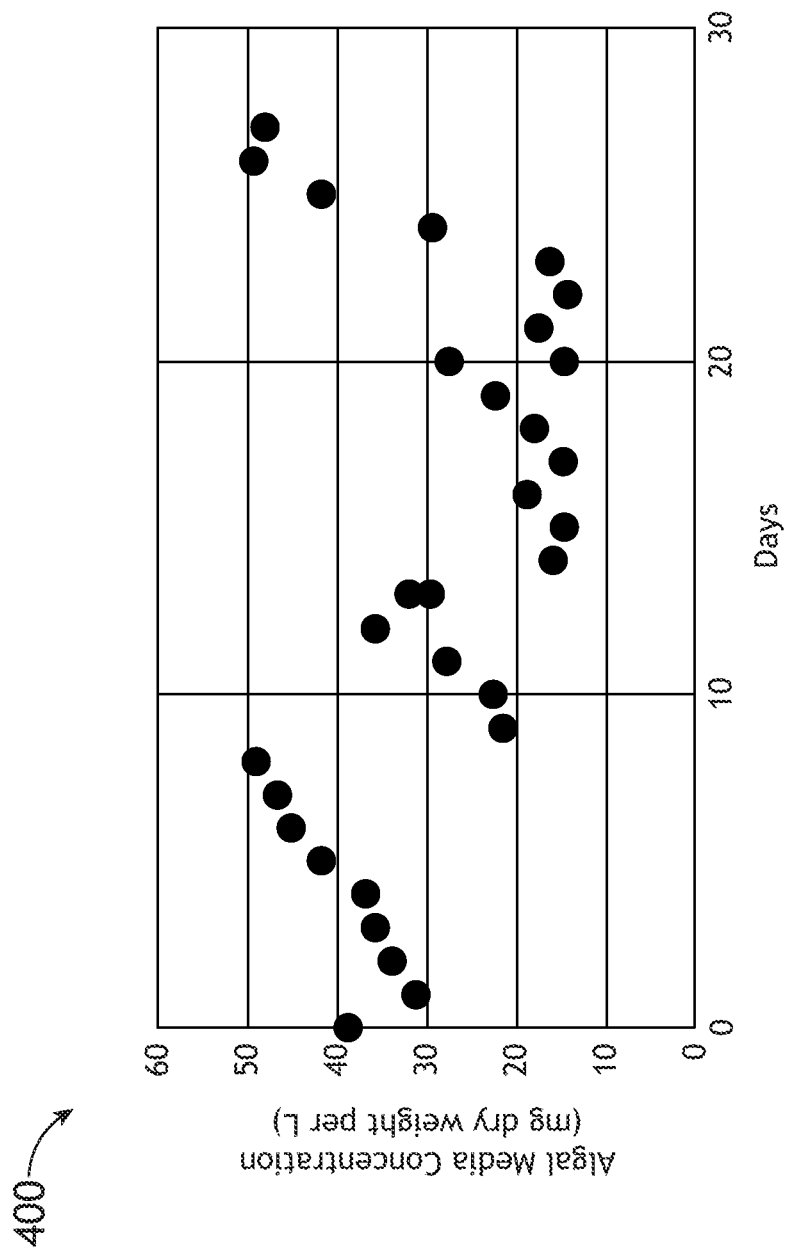
FIG. 4 illustrates algae concentration in an algal photobioreactor system over a one-month period, in accordance with one or more embodiments of the present disclosure.
Figure 5:
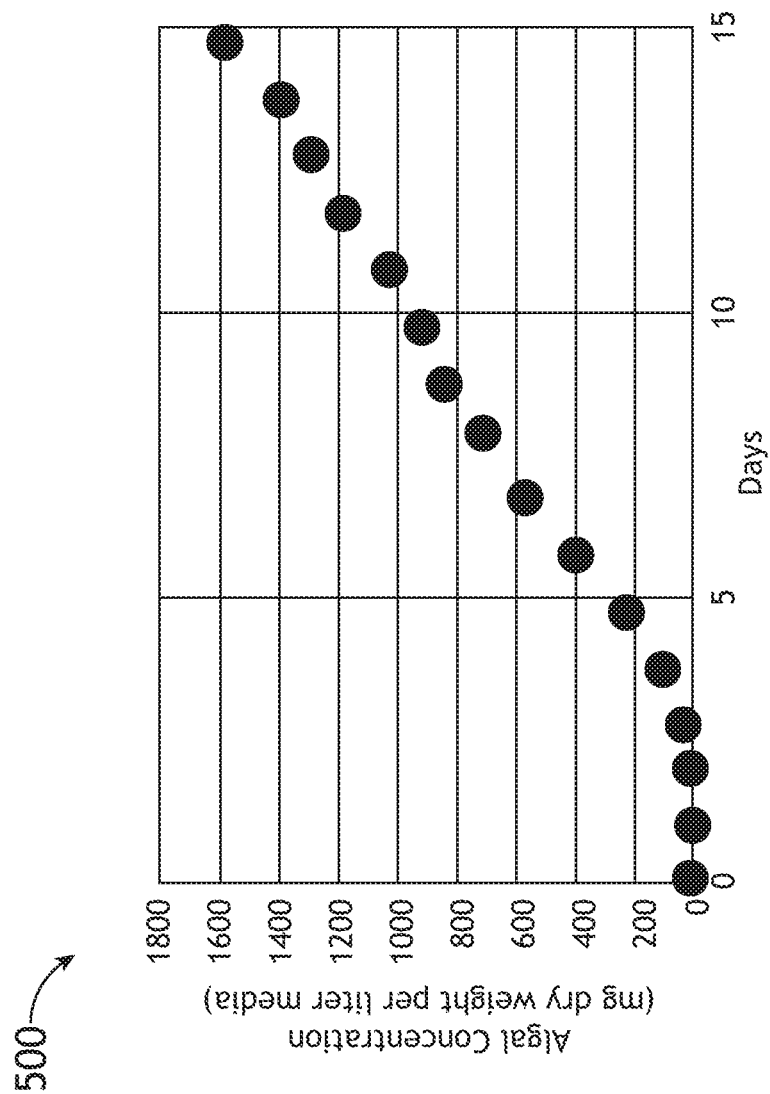
FIG. 5 illustrates the concentration of algae in suspension using the algal photobioreactor system over time, in accordance with one or more embodiments of the present disclosure.

FIG. 4 illustrates a graph 400 demonstrating the growth of algae in suspension in the algal photobioreactor system 100, in accordance with one or more embodiments of the present disclosure. The algal photobioreactor system 100 uses an algae-coated medium 120 in the form of a cotton rope, which reduces the number of algae, and mass of algae, that needs to be filtered from the water after a decontamination cycle. During a 30-day period, the dry weight of algae isolated from the algal photobioreactor system reached a maximum of approximately 50 mg per liter. FIG. 5 is a graph 500 demonstrating the growth of algae using a traditional algal photobioreactor system that does not use a medium for the algae. Under non-medium conditions, the dry weight of algae isolated from the algal photobioreactor system reached approximately 1600 mg per liter after 15 days, with potentially higher with the growth of algae showing no sign of abating at that time. When compared to the medium data, we see that the photobioreactor utilizing the traditional non-medium results in an over 30-fold increase in the number of algae suspended in the water. These results show that the photobioreactor using the medium 120 described herein would require considerably less effort to remove the algae after algal-based remediation of water.

Example II

Reduction of Nitrogen-Bound Nitrate in an Algal Photobioreactor System

Figure 6:
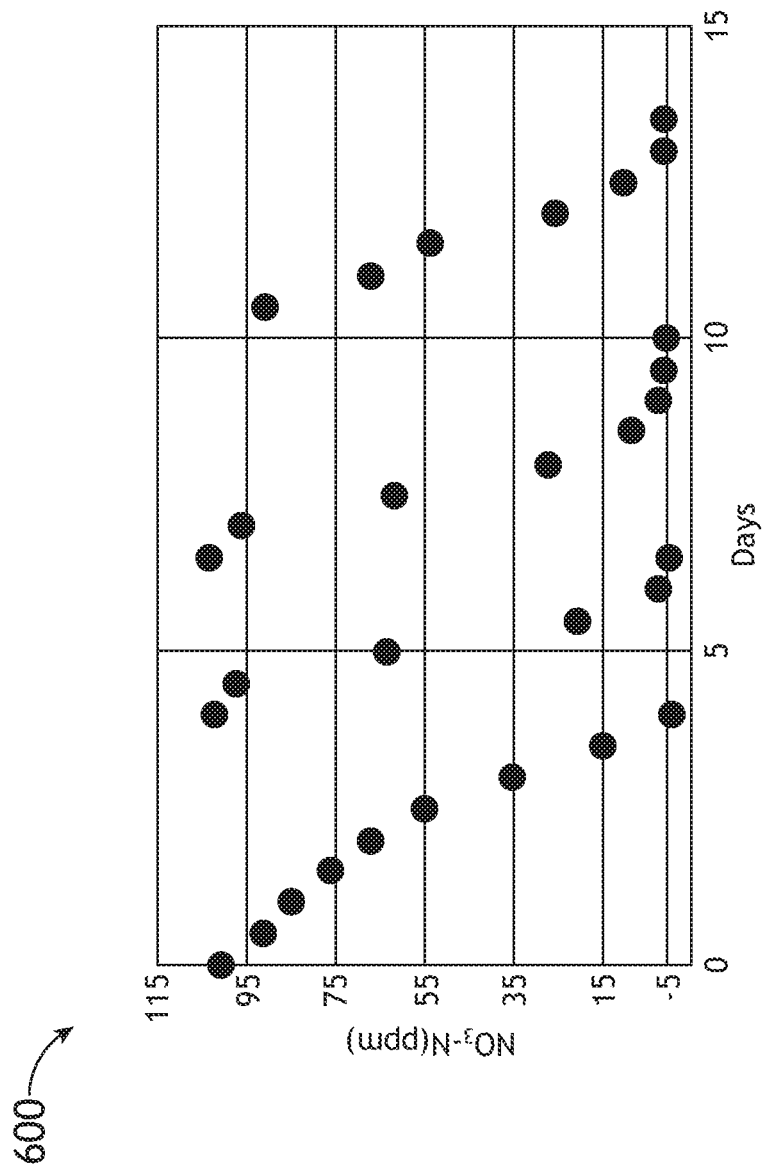
FIG. 6 illustrates the concentration of nitrogen-bound nitrate in the algal photobioreactor system over time, in accordance with one or more embodiments of the present disclosure.

FIG. 6 illustrates a graph 600 demonstrating the reduction of nitrogen-bound nitrate in an algal photobioreactor system that utilizes algae bound to a medium 120. Over a period of 28 days, the algal photobioreactor system was fed in four cycles approximately 100 ppm of nitrogen-bound nitrate. Within each cycle, the algal photobioreactor system reduced the nitrogen-bound nitrate to below 1 ppm. The average reduction rate was 15.4 ppm each day, and the maximum daily reduction rate recorded was 43.3 ppm. Overall, the algal photobioreactor system was able to remove 400 ppm of nitrogen-bound nitrate.

FIGS. 7-13D generally relate to a system and method for reducing the concentration of an organophosphate compound from at least one of groundwater, surface water, or waste water.

Embodiments of the present disclosure are directed to a system configured to reduce the concentration of an organophosphate compound from at least one of groundwater, surface water, or waste water. The system may comprise the algal photobioreactor system 100 as described above or other photobioreactor systems that utilize algae to catalyze and/or absorb contaminants. Embodiments of the present disclosure are also directed to a method to reduce the concentration of an organophosphate compound from at least one of groundwater, surface water, or waste water using the algal photobioreactor system 100 as described above or other photobioreactor systems that utilize algae. The method may comprise steps of the method 200 as described above.

Figure 7:
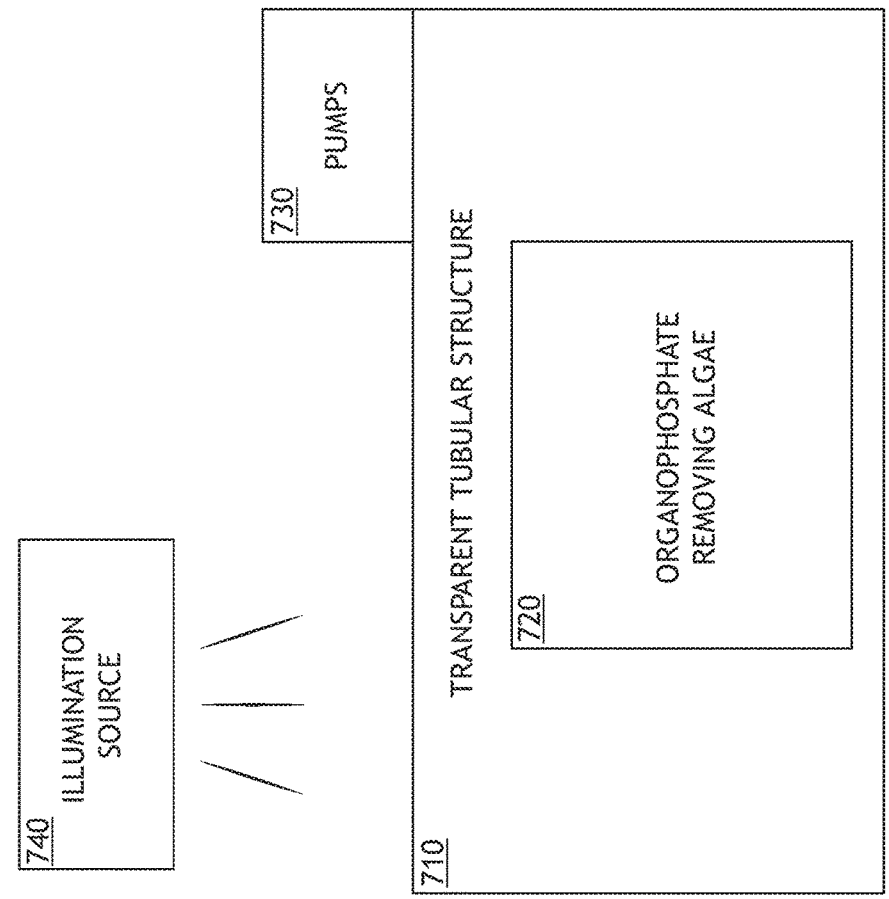
FIG. 7 is a block diagram illustrating an algal photobioreactor system, in accordance with one or more embodiments of this disclosure.

FIG. 7 is a block diagram illustrating an algae-circulating photobioreactor system 700, in accordance with one or more embodiments of this disclosure. In one embodiment, the algae-circulating photobioreactor system 700 includes a transparent tubular structure 710. The transparent tubular structure 710 provides a tube or path for the water to circulate through the algae-circulating photobioreactor system 700 during organophosphate removal process. The transparent tubular structure 710 also allows light to enter into the tube. The transparent tubular structure 710 may be made of any material known in the art that is transparent or translucent and can hold an aqueous solution. For example, the material may be glass (e.g., borosilicate, soda-lime silicate, or quartz). In another example, the transparent tubular structure 710 may be constructed of plastic (e.g., polypropylene, polycarbonate, high-density polyethylene (HDPE), low-density polyethylene (LDPE), or co-polyester). In still another example, the transparent tubular structure 710 may be constructed of recycled materials (e.g., plastic water bottles). The transparent tubular structure 710 of the algae-circulating photobioreactor system 700 may include aspects similar to the transparent tubular structure 110 of the algal photobioreactor system 100.

The transparent tubular structure 710 may be configured to take on any cross-sectional shape capable of supporting an algal culture. For example, the transparent tubular structure 710 may have a circular cross-section. In another example, the transparent tubular structure 710 may have rectangular cross-section. In still another example, the transparent tubular structure 710 may have an ovoid cross-section (e.g., a tube with an oval cross-section).

The transparent tubular structure 710 may be of any cross-sectional width to support the circulation of water through the algae-circulating photobioreactor system 700. For example, the transparent tubular structure 710 may have an outer diameter of 65 mm. In another example, the transparent tubular structure 710 may have an outer diameter greater than 65 mm. In another example, the transparent tubular structure 710 may have an outer diameter less than 65 mm.

The length of the transparent tubular structure 710 may be of any length needed to support the algae-circulating photobioreactor system 700. For example, the length of the tube may be approximately six meters. In another example, the length of the transparent tubular structure 710 may be less than six meters. In another example, the length of the transparent tubular structure 710 may be greater than six meters. For instance, the length of the transparent tubular structure 710 may be greater than 1000 meters.

The arrangement of the transparent tubular structure 710 may be of any configuration that allows the exposure of the transparent tubular structure 710 to light, while confining the transparent tubular structure to a selected space. The arrangement may require elbows, or curve pieces, to wrap the transparent tubular structure 710 efficiently within the selected space. For example, the arrangement of the transparent tubular structure 710 may take on an accordion arrangement. In another example, the transparent tubular structure 710 may be arranged in a spiral.

The flow of water through the transparent tubular structure 710 may be of any flow known in the art. For example, the flow of water through the transparent tubular structure 710 may be 15 $L \cdot min^{-1}$. In another example, the flow of water through the transparent tubular structure 710 may be less than 15 $L \cdot min^{-1}$. In still another example, the flow of water through the transparent tubular structure 710 may be greater than 15 $L \cdot min^{-1}$. For instance, the flow of water through the transparent tubular structure 710 may be greater than 1000 $L \cdot min^{-1}$.

The volume held by the transparent tubular structure 710 is related to the diameter and length of the transparent tubular structure 710 and may be of any volume known in the art. For example, the volume of the transparent tubular structure 710 may be 30 L. In another example, the volume of the transparent tubular structure 710 may be less than 30 L. In still another example, the volume of the transparent tubular structure 710 may be greater than 30 L. For instance, the volume of the transparent tubular structure 710 may be greater than 10,000 L.

In one embodiment, the transparent tubular structure 710 is configured as a continuous loop, allowing the water in the transparent tubular structure 710 to be recirculated over and over through the algae-circulating photobioreactor system 700. In another embodiment, the transparent tubular structure 710 is configured as a discontinuous, or non-circulating, with at least one input and one output.

In one embodiment, the algae-circulating photobioreactor system 700 may contain water derived from groundwater, surface water, and/or waste water. For example, the algae-circulating photobioreactor system 700 may contain surface water from agricultural run-off. In another example, the algae-circulating photobioreactor system 700 may contain waste water from a fire-retardant plant (e.g., am industrial plant that synthesizes or utilizes fire-resistant organophosphates).

In one embodiment, the algae-circulating photobioreactor system 700 includes an organophosphate-removing alga 720. The organophosphate-removing alga 720 is disposed in contact with the water running through the transparent tubular structure 710, absorbing and degrading organophosphate compounds, ultimately reducing the concentration of organophosphates in the water. The organophosphate-removing alga 720 also creates biomass that may be harvested.

In one embodiment, the species of organophosphate-removing alga 720 used in the algae-circulating photobioreactor system 700 may include any species of algae capable of facilitating the uptake of organophosphate compounds. For example, the organophosphate-removing alga 720 may include, but is not limited to, *Coccomyxa subellipsoidea* or *Tetradesmus obliquus*. The species of organophosphate-removing alga 720 may include any species of algae substantially resistant to organophosphates. For example, the organophosphate-removing alga 720 may include a species substantially resistant to an organophosphate herbicide with known toxicity to alga, such as paraoxon.

In another embodiment, the species of organophosphate-removing alga 720 used in the algal bioreactor system may include any species with substantially reduced photosystem I activity. Photosystem I is a major, but nonessential, photosystem (i.e., a multi-subunit complex) for photosynthetic organisms, including algae and plants. Reduction or absence of photosystem I may reduce the formation of toxic reactive oxygen species (ROS) in the algae, which may offset increased ROS formation induced by the presence of contaminants such as organophosphates. As described herein, the ability for algae to maintain a balanced level of ROS may allow the photosynthetic organism to catabolize organophosphates while remaining healthy. An example of an algae with a mutated or likely reduced photosystem I capacity is subtype C-169 of *Coccomyxa subellipsoidea*.

In one embodiment, the organophosphate compound targeted by the organophosphate-removing alga 720 is a pesticide. An organophosphate pesticide is any organophosphate compound capable of controlling pests (e.g., insects, weeds, animals). In accordance with the present invention, organophosphate pesticides include, but are not limited to, malathion, chlorpyrifos, parathion, ethyl-methyl parathion, methyl malathion, diazinon, ethion fonofos, acephate, formothion, azamethiphos, azinphos-ethyl, azinphos-methyl, chlorfenvinphos, cyanophos, danifos, fensulfothion, tribufos, dimethoate, dioxathion, disulfoton, endothion, ethion, fenitrothion, ethoprop, chlorethoxyfos, iprobenfos, isazofos, isofenphos, isoxathion, vamidothion, methidathion, methyl parathion, mevinphos, morphothion, naled, fenamiphos, fosmethilan, pyridaphenthion, omethoate, parathion, paraoxon, phencapton, phenthoate, phorate, phosalone, phosmet, phosnichlor, phosphamidon, leptophos, phoxim, pirimiphos-methyl, pirimiphos-ethyl, profenofos, prothidathion, prothoate, piperophos, tolclofos-methyl, ronnel, cadusafos, sophamide, demeton, demeton I (thiono isomer), demeton II (thiolo isomer), cyanthoate, tebupirimfos, terbufos, tetra chlorvinphos, thiometon, prothiofos, dialifos, trichlorfon and the like. The organophosphate-removing alga 720 may also target phosphonates, such as the herbicide glyphosate.

In one embodiment, the organophosphate compound targeted by the organophosphate-removing alga 720 is a fire-retardant. An organophosphate fire-retardant is any organophosphate compound capable of inhibiting fire. In accordance with the present invention, organophosphate fire-retardants include, but are not limited to, triphenyl phosphate (TPP), resorcinol bis-diphenylphosphate (RDP), bisphenol A diphenyl phosphate (BADP), and tricresyl phosphate (TCP).

In one embodiment, the organophosphate compound targeted by the algal organophosphate-removing alga 720 is an anti-foaming agent. An organophosphate anti-foaming agent is any organophosphate compound capable of reducing or hindering the formation of foam in an industrial process. In accordance with the present invention, organophosphate anti-foaming agents include, but are not limited to, tris(2-butoxyethyl) phosphate (TBEP) and tris-2-chloroisopropyl phosphate (TCPP)

In one embodiment, the organophosphate compound targeted by the organophosphate-removing alga 720 is a plasticizing agent. An organophosphate plasticizing agent is any organophosphate compound capable of increasing the plasticity or decreasing the viscosity of a material. In accordance with the present invention, organophosphate fire-retardants include, but are not limited to, tricresyl phosphate (TCP) and Tributyl Phosphate (TBP).

In another embodiment, the algae-circulating photobioreactor system 700 includes one or more pumps 730. The pumps 730 may be configured to circulate water (e.g., within the transparent tubular structure 710). The pumps 730 may be configured to move liquid components of algae-circulating photobioreactor system 700 (e.g., water, media adjusting components) from one component of the algae-circulating photobioreactor system 700 to another. The pumps 730 may be of any type of liquid pump known in the art including, but not limited to, dynamic pumps (e.g., centrifugal or submersible pumps) and/or positive displacement pumps (e.g., diaphragm, gear, peristaltic, lobe, and/or piston pumps). For example, the pumps 730 may include a centrifugal pump with flexible vanes.

In another embodiment, the algae-circulating photobioreactor system 700 includes an illumination source 740. The illumination source 740 provides light needed by the organophosphate-removing alga 720 for growth. In one embodiment, the illumination source 740 includes a natural light source (e.g., the sun). In another embodiment, the illumination source 740 includes an artificial light source (e.g., incandescent, halogen, fluorescent, or light emitting diode (LED)). For example, the illumination source 740 may be an 85 W RAY44 Anthrospec LED canopy light. In another embodiment, the algae-circulating photobioreactor system 700 utilizes both natural and artificial light. For example, the algae-circulating photobioreactor system 700 may turn on an artificial light source during the night or when days are cloudy.

The illumination source 740 may be configured similarly to the light source 150 of the algal photobioreactor system 100 as detailed above and may be configured to generate light of a selected one or more wavelengths. For example, the illumination source 740 may be configured to generate light of a selected one or more wavelengths. In another example, the illumination source 740 may be configured to emit any combination of infrared, visible, or ultraviolet light. For instance, the illumination source 740 may include a broadband light source configured to emit light having a wavelength or wavelength range between 400-700 nm. In the case of a broadband light source, the TOP illumination source 740 may be configured to emit light having a wavelength with ranges as follows: 400-500 nm, 400-600 nm, 500-700 nm, or 600-700 nm. In another example, the TOP illumination source 740 includes a red-light source configured to emit light having a wavelength or wavelength range between 622-780 nm. For instance, in the case of a red illumination source 740, the red illumination source 740 may be configured to emit light having a wavelength with ranges or values as follows: 622-700 nm, 622-725 nm, 650-700 nm, 650-750 nm, 650-780 nm, 622 nm, 625 nm, 630 nm, 640 nm, 650 nm, 660 nm, 670 nm, 675 nm, 680 nm, 690 nm, 700 nm, 710 nm, 720 nm, 730 nm, 740 nm, 750 nm, 760 nm, 770 nm, or 780 nm. In another example, the illumination source 740 includes a green light source configured to emit light having a wavelength or wavelength range between 520-610 nm. For instance, in the case of a green illumination source 740, the green illumination source 740 may be configured to emit light having a wavelength with ranges or values as follows: 520-580 nm, 520-600 nm, 520-550 nm, 550-600 nm, 550-610 nm, 520 nm, 525 nm, 530 nm, 540 nm, 550 nm, 560 nm, 570 nm, 575 nm, 580 nm, 590 nm, 600 nm, 605 nm, or 610 nm. In another example, the illumination source 740 includes a blue light source configured to emit light having a wavelength or wavelength range between 450-520 nm. For instance, in the case of a blue illumination source 740, the illumination source 740 is configured to emit light having a wavelength with ranges or values as follows: 400-450 nm, 450-480 nm, 450-470 nm, 460-495 nm, 470-495 nm, 400 nm, 425 nm, 450 nm, 455 nm, 460 nm, 465 nm, 470 nm, 475 nm, 480 nm, 485 nm, 490 nm, 495 nm, or 500 nm. The intensity of the light is preferably about 100-800 $\mu$mol/m$^2$/sec, with ranges and values such as 100-300 $\mu$mol/m$^2$/sec, 100-400 $\mu$mol/m$^2$/sec, 100-500 $\mu$mol/m$^2$/sec, 100-600 $\mu$mol/m$^2$/sec, 100-700 $\mu$mol/m$^2$/sec, 200-400 $\mu$mol/m$^2$/sec, 200-600 $\mu$mol/m$^2$/sec, 200-700 $\mu$mol/m$^2$/sec, 300-500 $\mu$mol/m$^2$/sec, 300-600 $\mu$mol/m$^2$/sec, 300-700 $\mu$mol/m$^2$/sec, 300-800 $\mu$mol/m$^2$/sec, 400-500 $\mu$mol/m$^2$/sec, 400-600 $\mu$mol/m$^2$/sec, 400-700 $\mu$mol/m$^2$/sec, 400-800 $\mu$mol/m$^2$/sec, 500-600 $\mu$mol/m$^2$/sec, 500-700 $\mu$mol/m$^2$/sec, 500-800 $\mu$mol/m$^2$/sec, 100 $\mu$mol/m$^2$/sec, 200 $\mu$mol/m$^2$/sec, 300 $\mu$mol/m$^2$/sec, 400 $\mu$mol/m$^2$/sec, 500 $\mu$mol/m$^2$/sec, 600 $\mu$mol/m$^2$/sec, 700 $\mu$mol/m$^2$/sec, and 800 $\mu$mol/m$^2$/sec are envisioned.

Figure 8:
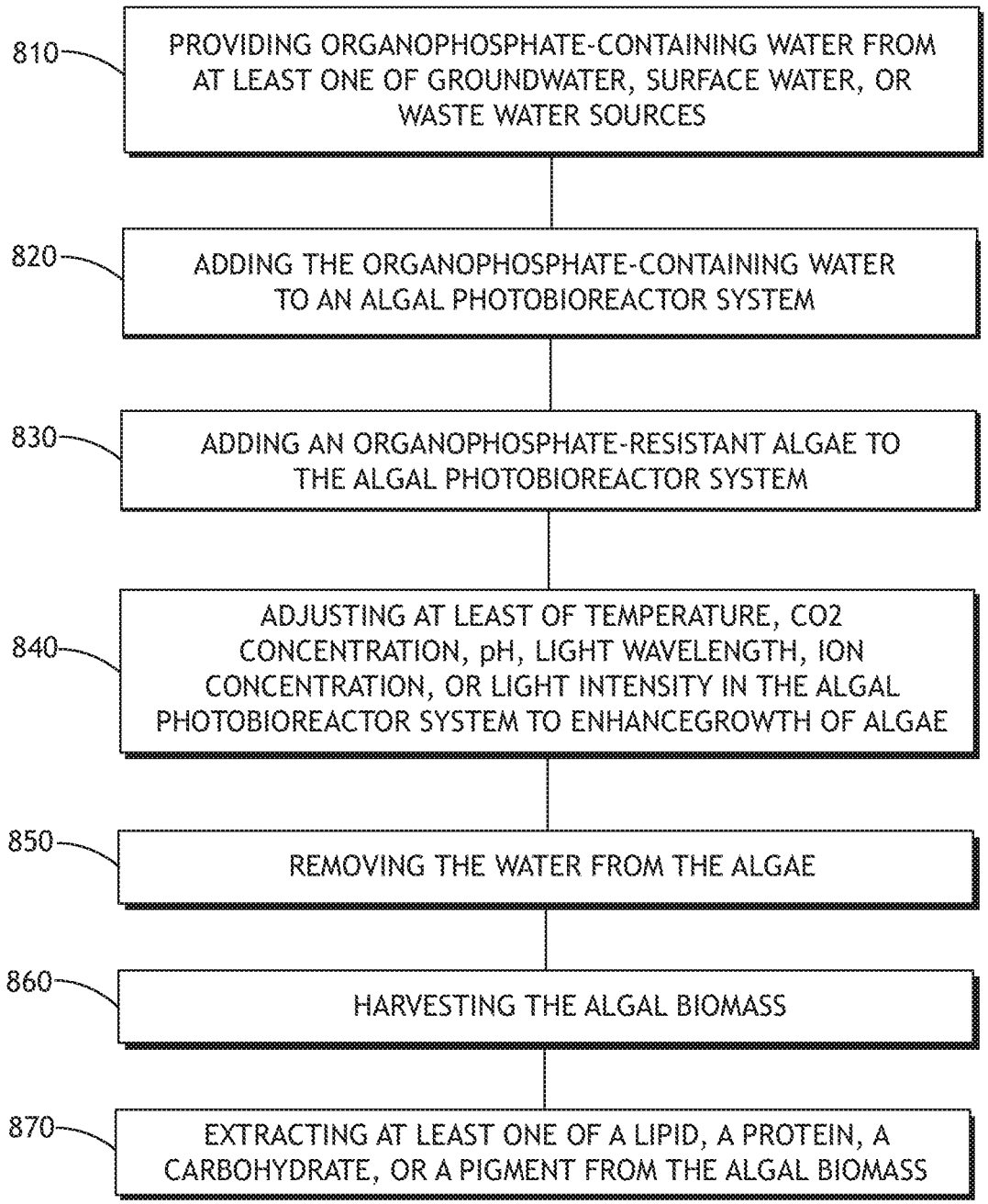
FIG. 8 is a flow diagram illustrating a method for removing organophosphates from water using an algal photobioreactor system, in accordance with one or more embodiments of the present disclosure.

FIG. 8 illustrates a method 800 for reducing the concentration of an organophosphate compound from at least one of groundwater, surface water, or waste water, in accordance with one or more embodiments of the present disclosure.

In one embodiment, the method 800 includes a step 810 of providing organophosphate-containing water from groundwater, surface water, or waste water sources. For example, groundwater from an organophosphate-contaminated municipal well may be provided for organophosphate removal. By way of another example, surface water from an organophosphate-contaminated lake may be provided for or removal. By way of another example, waste water from an industrial complex may be provided for organophosphate removal.

In another embodiment, method 800 includes a step 820 of adding organophosphate-containing water to a photobioreactor system. The photobioreactor system utilized in the method 800 may include the algae-circulating photobioreactor system 700 and/or the algal photobioreactor system 100 described previously herein. In another embodiment, the photobioreactor system utilized in the method 800 may include photobioreactor systems that use different water decontamination strategies (e.g., external decontamination systems (e.g., pond-based) or internal decontamination systems with different methods for algal separation). In another embodiment, the method 800 includes a step 830 of adding organophosphate-removing algae 720 to the photobioreactor system.

In another embodiment, step 840 of the method 200 includes adjusting at least one of temperature, $CO_2$ concentration, pH, wavelength, or light intensity in the photobioreactor system to enhance the growth of algae. The adjustment of one or more of these parameters may be controlled automatically by a controller. In another embodiment, one or more of the parameters may be adjusted manually. For example, the temperature of the photobioreactor system may be adjusted by manually adjusting a heating/cooling subsystem. In another example, light intensity may be adjusted by manually turning on the illumination source 740. Adjustments may be made to the photobioreactor system at the beginning of the decontamination process (e.g., when the water and algae are first combined), at one or more times during the decontamination process, or continuously during the decontamination process.

In another embodiment, the method includes a step 850 of removing water from the organophosphate-removing algae 720. Water may be separated from the organophosphate-removing algae 720 by any means known in the art. For example, the organophosphate-removing algae 720 may be removed from the water via centrifugation. In another example, the organophosphate-removing algae 720 may be removed via a filter. In another example the organophosphate-removing algae 720 may be attached to a solid support within the transparent tubular structure 710, allowing the water to be removed from the transparent tubular structure 710 without disturbing the organophosphate-removing algae 720.

In another embodiment, the method 200 includes a step 860 of harvesting the algal biomass. The algae biomass may be harvested by any means known in the art. For example, the algal biomass may be removed (e.g., scraped) from a filter or a collection container in a centrifuge. In another example, the algae may be removed by scraping from a solid support within the transparent tubular structure 710.

In another embodiment, the method 800 further includes a step of extracting at least one of lipids, proteins, carbohydrates, or pigments from the algal biomass. For example, the lipid triglyceride may be extracted from the algal biomass for use as a precursor for bio-oil. In another example, carbohydrates may be isolated from the algal mass for use in ethanol production.

In another embodiment, the method 800 further includes a step of adjusting at least one of the temperature, the $CO_2$ concentration, the pH, the light wavelength, or the light intensity in the algal photobioreactor system to enhance lipid synthesis. For example, the $CO_2$ concentration of the algal culture may be adjusted to a range between 1% and 5% to enhance lipid production. In another example, the $CO_2$ culture may be adjusted to 2.5%.

Example III

Growth of a *C. subellipsoidea* Culture

*C. subellipsoidea*, C-169 was cultured in the following manner. All cultures were grown in Bold's Basal Medium (BBM) made using water purified using Millipore reverse osmosis system. Cultures were grown in 25 ml Erlenmeyer flasks or in 20 ml test tubes as stated in the assay methods. Cultures were grown in a warm room at 25° C. and grown at approximately 170 μmol of light under mild agitation. *C. subellipsoidea* cultures generated in test tubes were produced by adding 1 ml of 1.3OD stationary phase cells to 4 ml of BBM media resulting in a 5 ml culture at approximately 0.325OD.

Example IV

Assessment of Paraoxon Concentration/Degradation in a *C. subellipsoidea* Culture Assessment of paraoxon and the paraoxon degradation product p-nitrophenol, in BBM media was performed by measuring absorbance at 280 nm and 408 nm respectively using a ThermoScientific Biomate 6 spectrophotometer. Cultures were spun down and supernatant removed from the cell pellet to minimize absorbance due to amino acids and chlorophyll. Cultures were harvested simultaneously to ensure that amino acid, and chlorophyll in the media as a result of growth and cell lysis would be consistent between test and control groups. An increase in the yellow coloring of the BBM media is indicative of paraoxon degrading into p-nitrophenol. The degradation of paraoxon to p-nitrophenol involves the removal of the phosphate group from the nitrophenol moiety of paraoxon (e.g., FIG. 9A) and is predicted to involve either an attack upon the phosphate of the phosphate group by a reactive oxygen species (e.g., the compound (ROS)—O in FIG. 9B), or the involvement of an endogenous phosphotriesterase.

To determine the rate of organophosphate degradation over time, *C. subellipsoidea* cultures were grown in 250 ml Erlenmeyer flasks containing BBM media at 25° C. under agitation for 2 weeks until stationary at an optical density of approximately 1.3 OD. 25 ml Erlenmeyer flasks were sterilized, and in a sterile laminar flow hood 15 ml of BBM media were added to control flasks and 14 ml of sterilized BBM media was added to each of the test flasks. Test flasks were then inoculated with 1 ml of stock *C. subellipsoidea* culture at approximately 1.3 OD. Subsequently, 1 μl of organophosphate was added to each flask and flasks were sealed with breathable tops. Cells were allowed to grow for 10 days at 25° C. with samples being taken every 2 days and immediately lyophilized overnight. Dried sample were removed and frozen at −80° C. until analysis was performed.

Gas Chromatography-Mass Spectroscopy (GC-MS) analysis of organophosphates first involved the liquid-liquid extraction of samples resuspended in 50 μl of Millipore water after lyophilization using 300 μl of chloroform. Samples were vortexed for 60 sec and then organic layers were removed by pipetting and placed into GCMS sample vials. Samples were separated and analyzed using an Agilent 6890 GCMS equip with an Agilent DB-5 30 m×0.250 mm and an Agilent 5973 detector. Oven condition and temperature were as follows. An initial temperature of 100° C. was held for 4 minutes, following which a temperature of 200° C. was reached by an increase of 5° C./min. Lastly, a temperature of 300° C. was reached by an increase of 10° C./min and then held at 300° C. for 10 min. Injection volumes for all samples was 1 μl. FIG. 9C is a GC-MS chromatograph graph of a paraoxon-extracted sample (e.g., the main peak referring to paraoxon)

In vitro assay or singlet oxygen degradation of organophosphates was performed by adding 5 ml of DI water to a 20 ml test tube. Pure paraoxon at a volume of 1 μl was added to each tube and mixed thoroughly. Following this, 1 μl of Rose Bengal was added to each tube in the test group. Samples were mixed and allowed to set for 5 min at room temperature. Following this 1 ml of sample was collected and degradation of paraoxon measured by absorbance at 280 nm and production of p-nitrophenol was measured by absorbance at 480 nm.

For time-course assessment of paraoxon degradation in algal cultures, the *C. subellipsoidea* subtype C-169 was cultured in 250 Erlenmeyer flasks containing BBM media until a stationary OD of 1.3 was reached. In a sterile laminar flow hood 4 ml of BBM media was added to each test tube, n=5. 1 ml of 1.3 OD *C. subellipsoidea* culture was then added to each tube. Pure paraoxon (99%) was added to both control and experimental groups at a volume of 1 ul. Tubes were subjected to treatment and then placed in front of a light source emitting approximately 169 umol of light and kept at 25° C. Samples were then taken at various time points, cells pelleted via centrifugation at 13,000 RPMs, and analyzed by measuring absorbance at 280 nm and 408 nm to detect paraoxon and p-nitrophenol respectively.

To assess paraoxon degradation by algae that was not due to active biological processes (e.g., not dependent on a fully functional algal cell), test group tubes were then placed in boiling water for 10 minutes on a hot plate. Once removed test group cultures were allowed to cool to room temperature and then in a laminar flow sterile hood 1 ul of paraoxon was added to control and test groups. Cultures were allowed to incubate for 24 h and 48 h at the end of which 1 ml from each sample was taken and centrifuged, and absorbance of the supernatant read at 280 nm.

To assess light independent degradation of paraoxon, experimental group tubes were wrapped in foil to eliminate photo-stimulation of the photosystems. Both groups were placed in front of a light source providing at 169 μmol of light for 12 h. Samples were taken, centrifuged and supernatant was then decanted into a 1 ml cuvette. Absorbance was read at 408 nm to assay the production of p-nitrophenol from paraoxon hydrolysis.

To assess the effect of light on the ability of heat-killed algae to degrade paraoxon, experimental group tubes were placed in boiling water for 10 min. Cultures were allowed to cool to room temperature and then 1 μl of paraoxon was added to control and test groups while maintaining sterile conditions. Control cultures were then wrapped in foil to completely prevent light penetration and all cultures were allowed to incubate in front of a grow light for 12 h at the end of which 1 ml from each sample was taken, centrifuged, and absorbance of the supernatant was read at 280 nm.

To assess the degradation of paraoxon in a fully oxidized environment, the experimental tubes were then placed in front of a grow light overnight (12 h) and the control was wrapped in foil. The test group was inspected for the absence of green pigment and then 1 μl of paraoxon was added to each of the tubes with all foil removed. Following this all groups were placed in front of a grow light and allowed to incubate for 12 h. Sample absorbance was read at 480 nm for the production of p-nitrophenol.

To assess the degradation of paraoxon in the absence of light and the inhibition of mitochondria oligomycin (an ATP synthase inhibitor) and rotenone (an inhibitor of the electron transport chain in mitochondria) were added to experimental groups to a final concentration of 20 mg/ml and 1 μl (1.27 mg) of paraoxon were added to all tubes. Both control and experimental group tubes were wrapped in foil. Both groups were placed in front of a grow light at 169 μmol of light for 12 h. Sample absorbance was read at 408 nm to assay the production of p-nitrophenol from paraoxon hydrolysis.

To assess the degradation of paraoxon by algae upon the inhibition of photosynthesis, 100 μg of DCMU was added to the experimental groups. Experimental and control groups were both treated with 1 μl (1.27 mg) of 99% pure paraoxon. Both control and experimental groups were placed in front of a grow light at approximately 169 mmol. Cultures were allowed to grow for 12 hours, samples were, centrifuged, centrifuge and the supernatant was collected. Absorbance was read at 408 nm to detect the formation of p-nitrophenol.

To assess the degradation of paraoxon by algae upon the inhibition of photosynthesis and the reduction of free radical formation, 100 μg of DCMU and 100 ug of NAC were added to the experimental groups. Experimental and control groups were both treated with 1 μl (1.27 mg) of 99% pure paraoxon. Both control and experimental groups were placed in front of a grow light at approximately 169 mmol. Cultures were allowed to grow for 12 hours, samples were, centrifuged, centrifuge and the supernatant was collected. Absorbance was read at 408 nm to detect the formation of p-nitrophenol.

Example V

Organophosphates are Degraded by *Coccomyxa subellipsoidea*

Figure 10A:
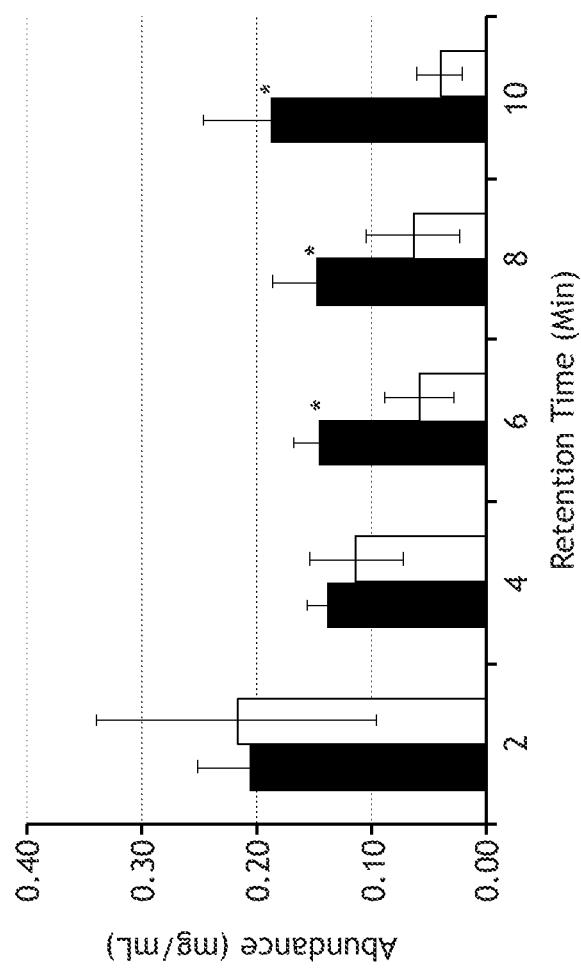
FIG. 10A is a graph illustrating the degradation of paraoxon by an algal culture over time, in accordance with one or more embodiments of the present disclosure.

To address whether the degradation of organophosphate involves reactive oxygen species or an endogenous phosphatase, time-course experiments were completed using actively growing cultures of *C. subellipsoidea*. Paraoxon was added to a final concentration of 0.17 mg/mL and culture supernatants were interrogated for breakdown using gas chromatography-mass spectrometry (GC-MS) every 48 h for 10 days. Controls lacked *C. subellipsoidea* and likewise were monitored over the same 10-day period. One milliliter samples were taken and lyophilized, remaining material was resuspended in 100 μl of ultrapure water and extracted with chloroform. Levels of paraoxon were quantified in the organic phase using GC-MS (FIG. 10A). The data demonstrated paraoxon was broken down to just above detectable limits (<0.025 mg/mL) after 6 days coincident with the increased yellow color corresponding to p-nitrophenol production. While these data confirmed that *C. subellipsoidea* was able to degrade paraoxon, the apparent rate of degradation, while cell dependent, was inconsistent with an enzyme catalyzed mechanism of degradation.

Figure 10B:
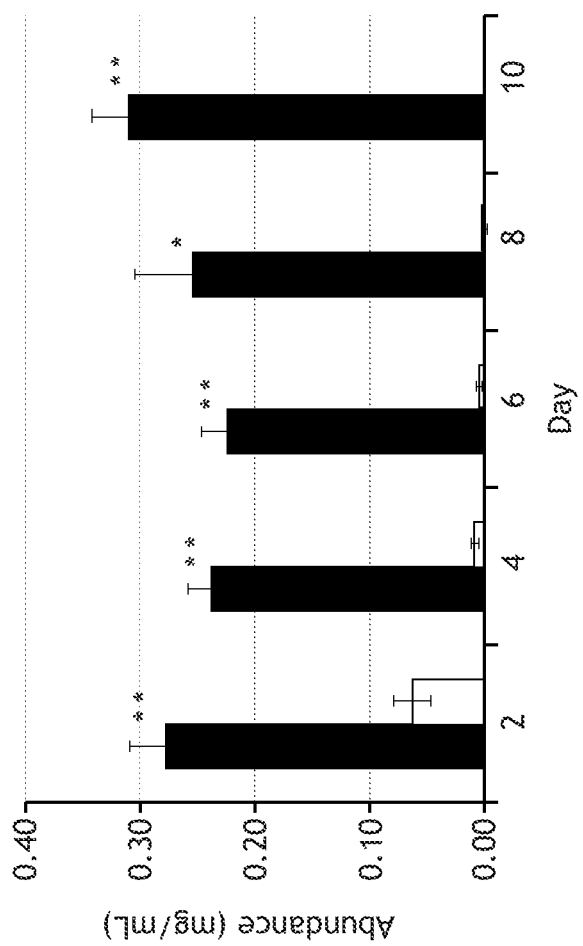
FIG. 10B is a graph illustrating the degradation of malathion by an algal culture over time, in accordance with one or more embodiments of the present disclosure.
Figure 10C:
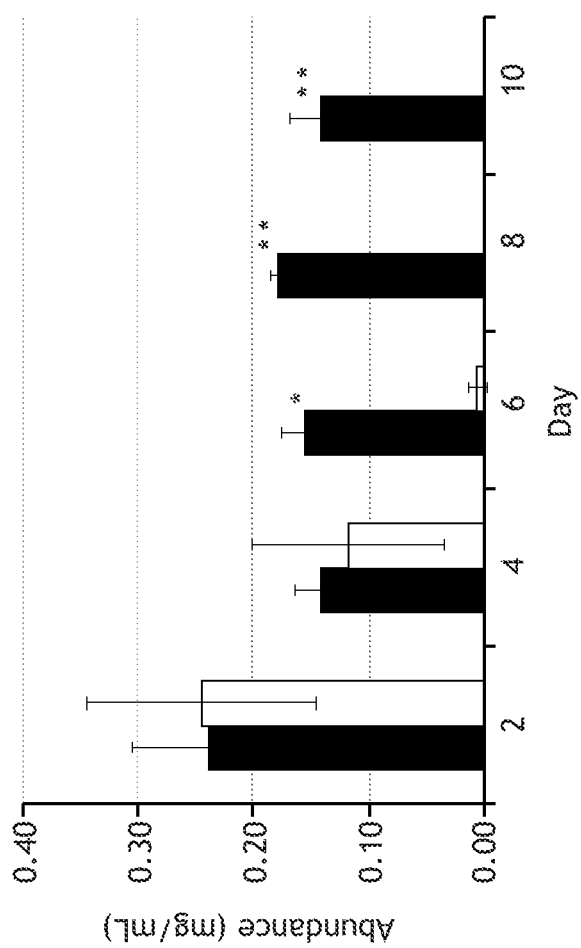
FIG. 10C is a graph illustrating the degradation of diazinon by an algal culture over time, in accordance with one or more embodiments of the present disclosure.

Given that paraoxon breakdown was consistent with a cell-dependent process, it was of importance to address whether other organophosphates were also broken down in a comparable cell-dependent manner thus providing important insights addressing mechanism. Malathion and diazinon (both at 0.15 mg/mL, f.c.) were tested using comparable cultures of *C. subellipsoidea* and controls containing the compounds at the same concentrations but without cells as controls (FIGS. 10B and 10C). Both malathion and diazinon were broken down through a cell-dependent process to essentially undetectable levels between days 4 and 6 in culture. Malathion and diazinon differ in chemical composition and structure around the chiral phosphate when compared to paraoxon (FIG. 10D-F). Given the differences in structures and that all three are broken down in the presence of *C. subellipsoidea*, these data did not support the hypothesis that the hydrolysis of these organophosphate compounds was catalyzed by an endogenous phosphotriesterase. This is especially evident considering that if paraoxon is a preferred substrate for an endogenous phosphotriesterase, there would be less efficiency as the degree of branching increases R group subject to enzymatic hydrolysis. These data were quite the opposite and showed that diazinon and malathion, which are more branched than paraoxon, are degraded under the enzymatic model the active site accommodates substrates with smaller side chains more quickly with more specificity for these species.

Example VI

ROS Production Increases Organophosphate Degradation

Figure 11A:
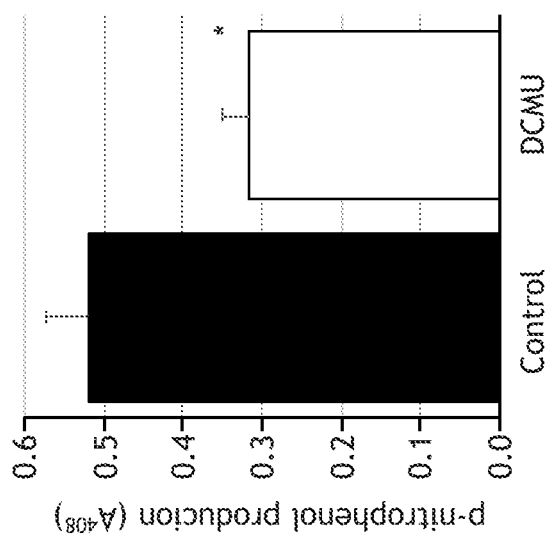
FIG. 11A is a graph illustrating the degradation of paraoxon in growing cultures of *C. subellipsoidea* by assaying p-nitrophenol production, in accordance with one or more embodiments of the present disclosure.

As a next step to determine the mechanism of organophosphate degradation, we addressed whether this process was dependent on the presence of a fully functional Photosystem II. For these studies, paraoxon was chosen as the experimental organophosphate as p-nitrophenol production, the product of its hydrolysis, could be easily measured spectrophotometrically. Following the same experimental approach as above, paraoxon was added to a final concentration of 0.25 mg/mL to actively growing cultures of *C. subellipsoidea* in the presence or absence of 3-(3,4-dichlorophenyl)-1,1-dimethylurea (DCMU), a Photosystem II inhibitor for 12 h. The production of p-nitrophenol was decreased nearly two-fold in the presence of DCMU (FIG. 11A).

Figures 9A, 9B:
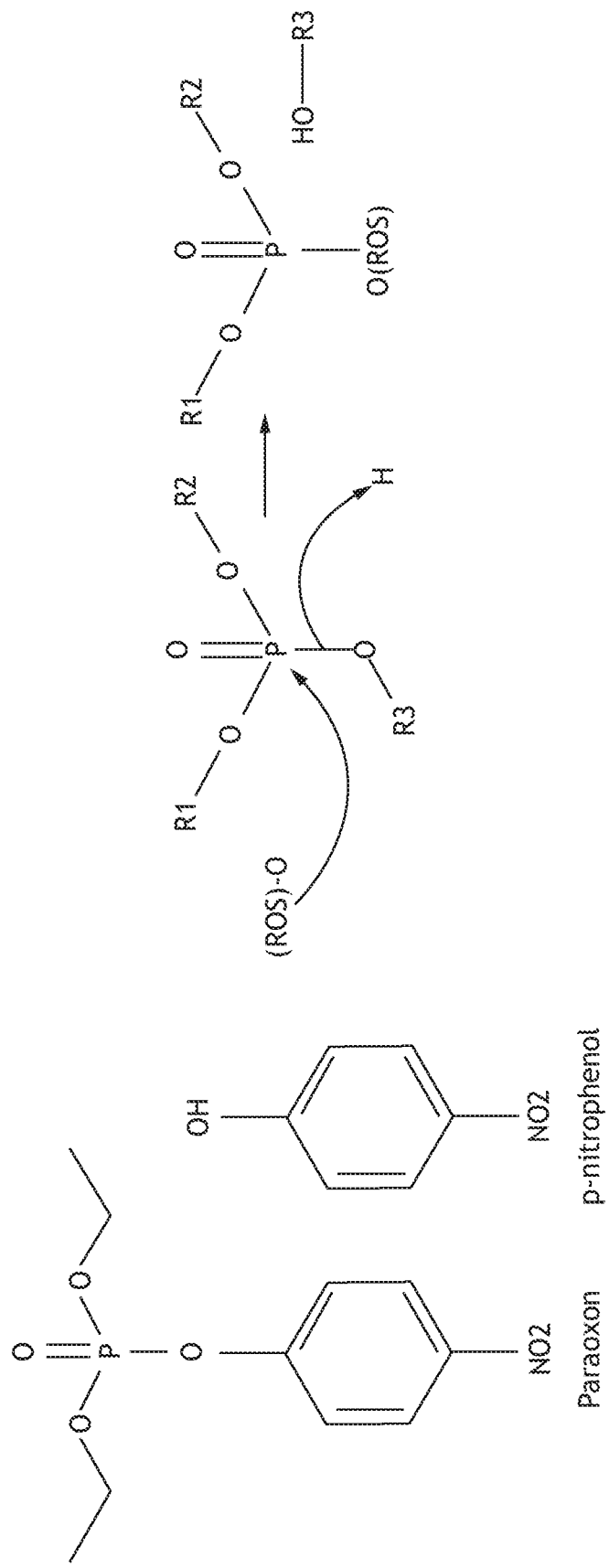
FIG. 9A is an illustration of the chemical paraoxon and p-nitrophenol, in accordance with one or more embodiments of the present disclosure.
FIG. 9B is an illustration of the mechanism by which organophosphates can be hydrolyzed by the attack of reactive oxygen species, in accordance with one or more embodiments of the present disclosure.
Figure 9C:
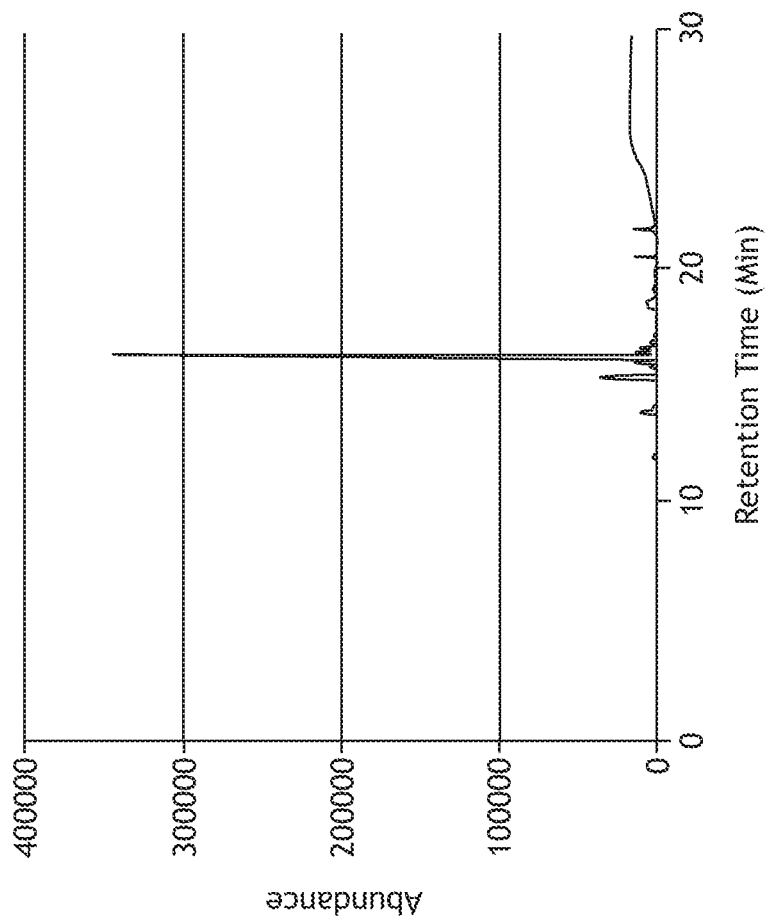
FIG. 9C illustrates a chromatograph of paraoxon extracted from an algal culture, in accordance with one or more embodiments of the present disclosure.
Figure 11B:
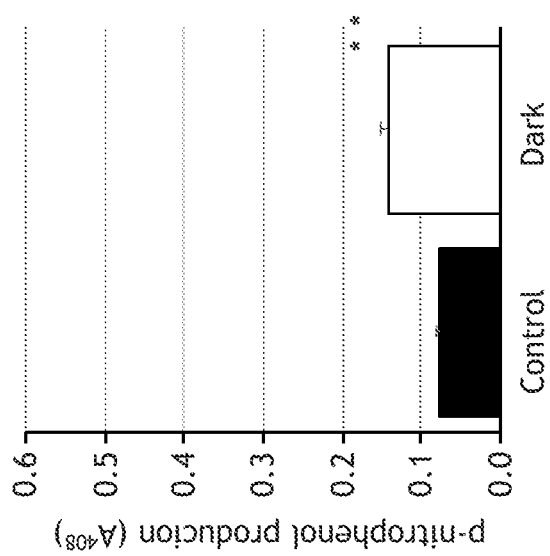
FIG. 11B is a graph illustrating the degradation paraoxon in growing cultures of *C. subellipsoidea* containing paraoxon in light and dark conditions, in accordance with one or more embodiments of the present disclosure.

These data support the notion that Photosystem II activity, perhaps due to increased reactive oxygen species (ROS)

production, resulting from inefficient photosynthesis, contributes to paraoxon degradation (e.g., see FIG. 9C). To ensure that the observed decrease in activity was not due to an off-target effects of DCMU, paired experiments of identical cultures were set up with both paraoxon and DCMU, one in the light and one in the dark and the production of production of p-nitrophenol was monitored after 12 h (FIG. 11B). These experiments demonstrated there was increased p-nitrophenol production from paraoxon degradation in the dark cultures. This could occur due to a switch from anabolic to catabolic metabolism in the dark resulting in increased ROS, derived from the activity of mitochondrial complexes 1 and 4. Collectively these data suggest there is light dependent hydrolysis of paraoxon likely due to ROS production by Photosystem II as a result of inefficient photosynthesis. Inhibiting Photosystem II and thus anabolic metabolism with DCMU limits ROS production under high light conditions.

Example VII

Figure 11C:
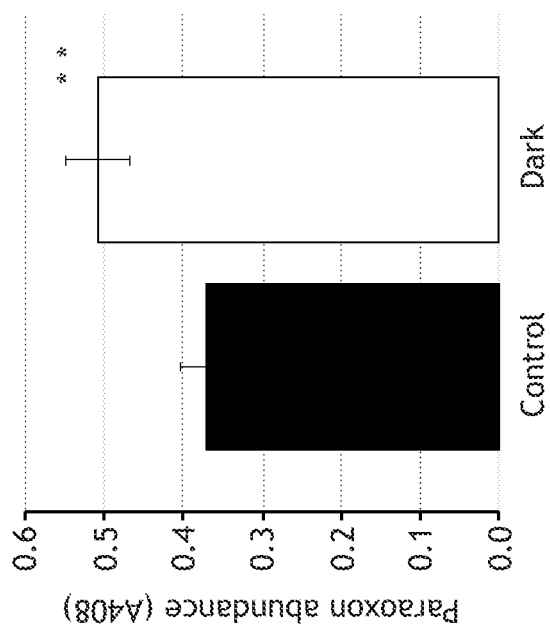
FIG. 11C is a graph illustrating Paraoxon present in *C. subellipsoidea* after light or dark conditions, in accordance with one or more embodiments of the present disclosure.
Figure 11D:
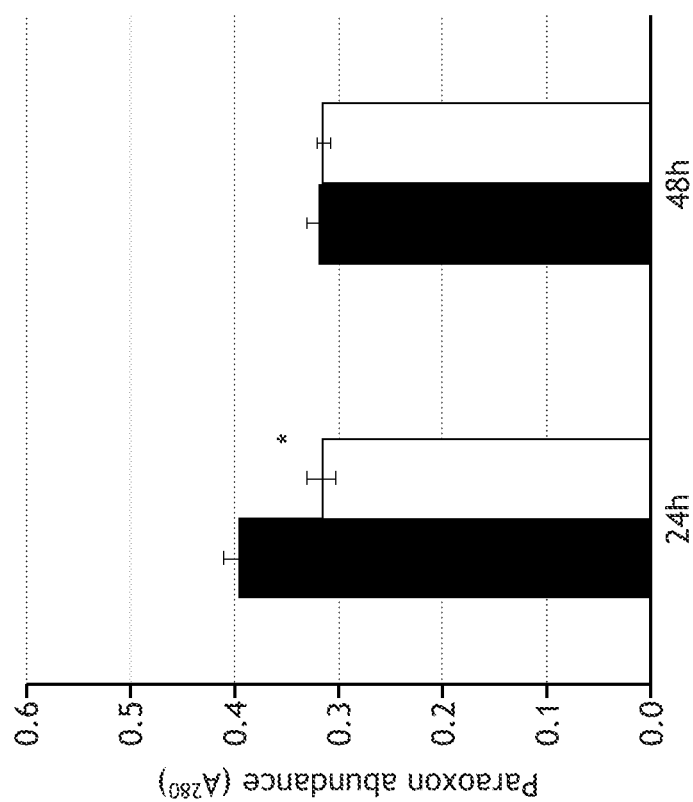
FIG. 11D is a graph illustrating the degradation of paraoxon in growing cultures of *C. subellipsoidea* in control or heat-treated cultures, in accordance with one or more embodiments of the present disclosure.
Figure 12A:
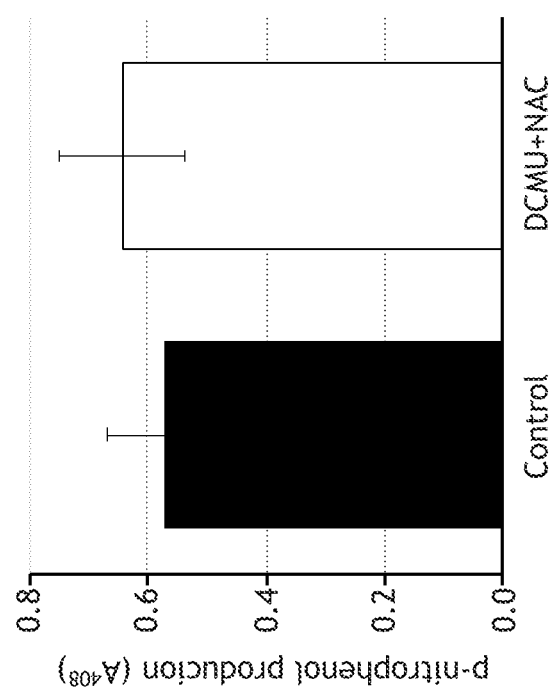
FIG. 12A is a graph illustrating the degradation of paraoxon by assaying p-nitrophenol production in *C. subellipsoidea*, in accordance with one or more embodiments of the present disclosure.
Figure 12B:
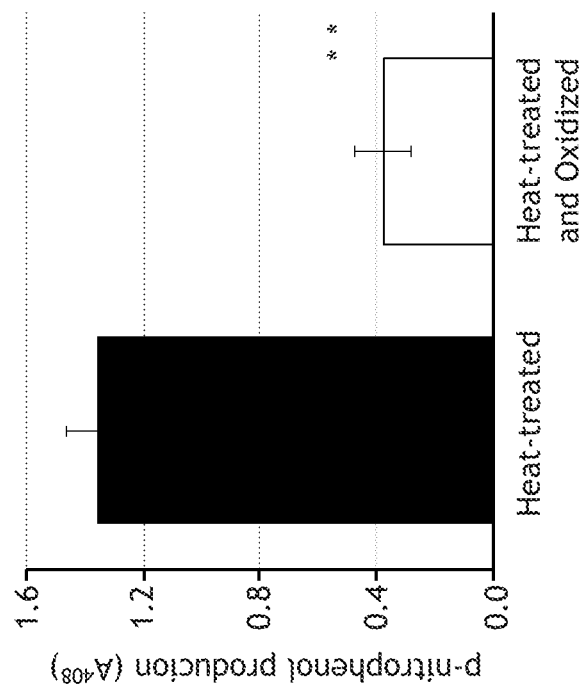
FIG. 12B is a graph illustrating the production of p-nitrophenol as a proxy for paraoxon degradation in *C. subellipsoidea* cultures, in accordance with one or more embodiments of the present disclosure.
Figure 12C:
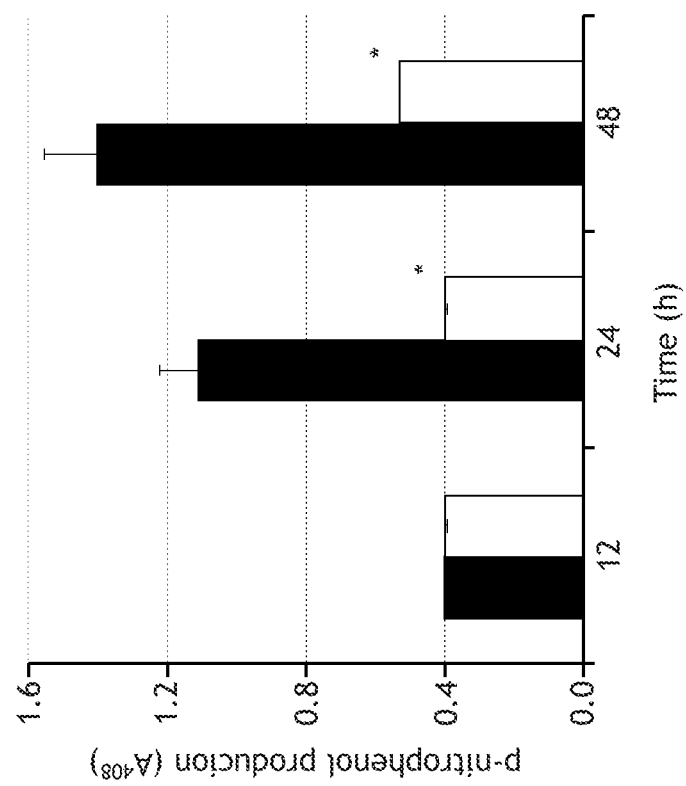
FIG. 12C is a graph illustrating the degradation of paraoxon by assaying p-nitrophenol production in *C. subellipsoidea* cultures, in accordance with one or more embodiments of the present disclosure.
Figure 13A:
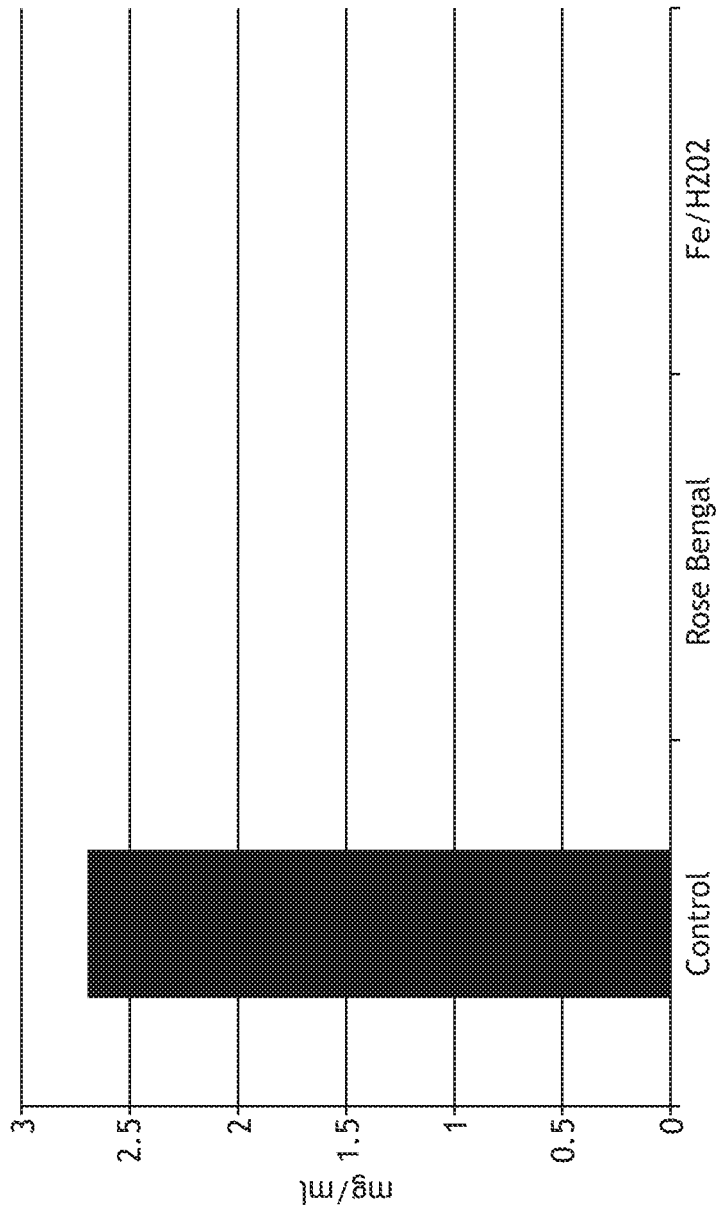
FIG. 13A is a graph illustrating the ability of hydroxyl radicals and peroxides produced by Rose Bengal and peroxide/ferrous sulfate, respectively, to hydrolyze paraoxon, in accordance with one or more embodiments of the present disclosure.
Figure 13B:
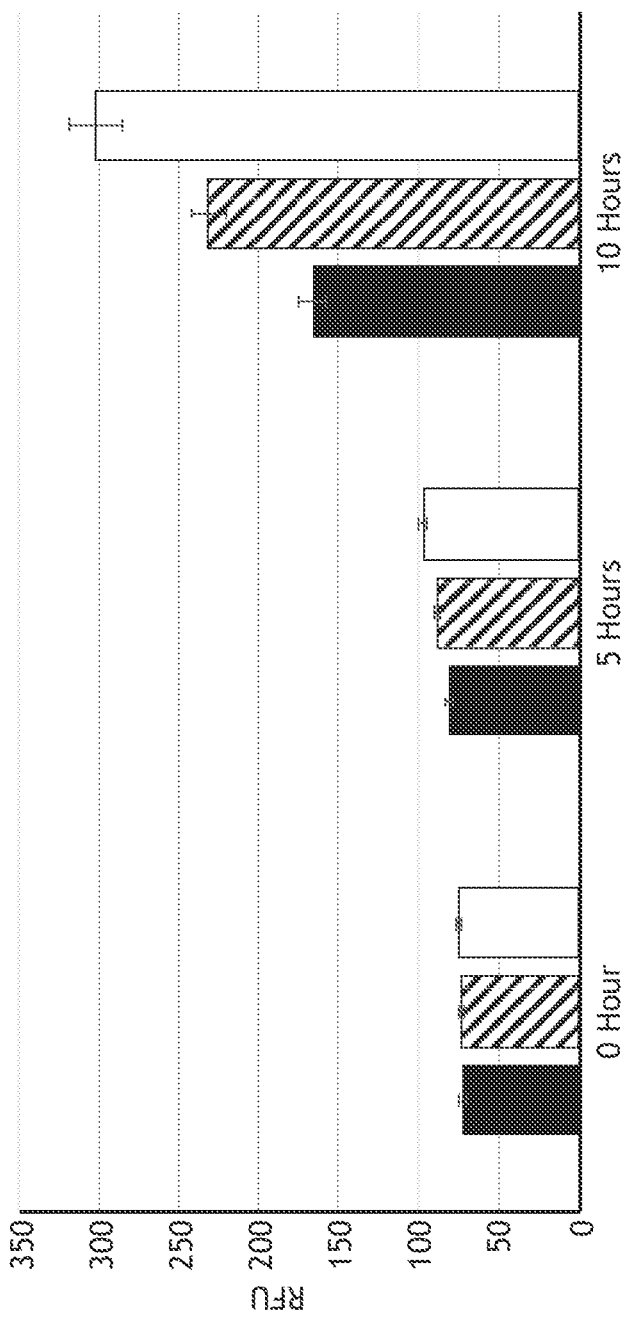
FIG. 13B is a graph illustrating the production of reactive oxygen species in *C. subellipsoidea* cultures, in accordance with one or more embodiments of the present disclosure.
Figure 13C:
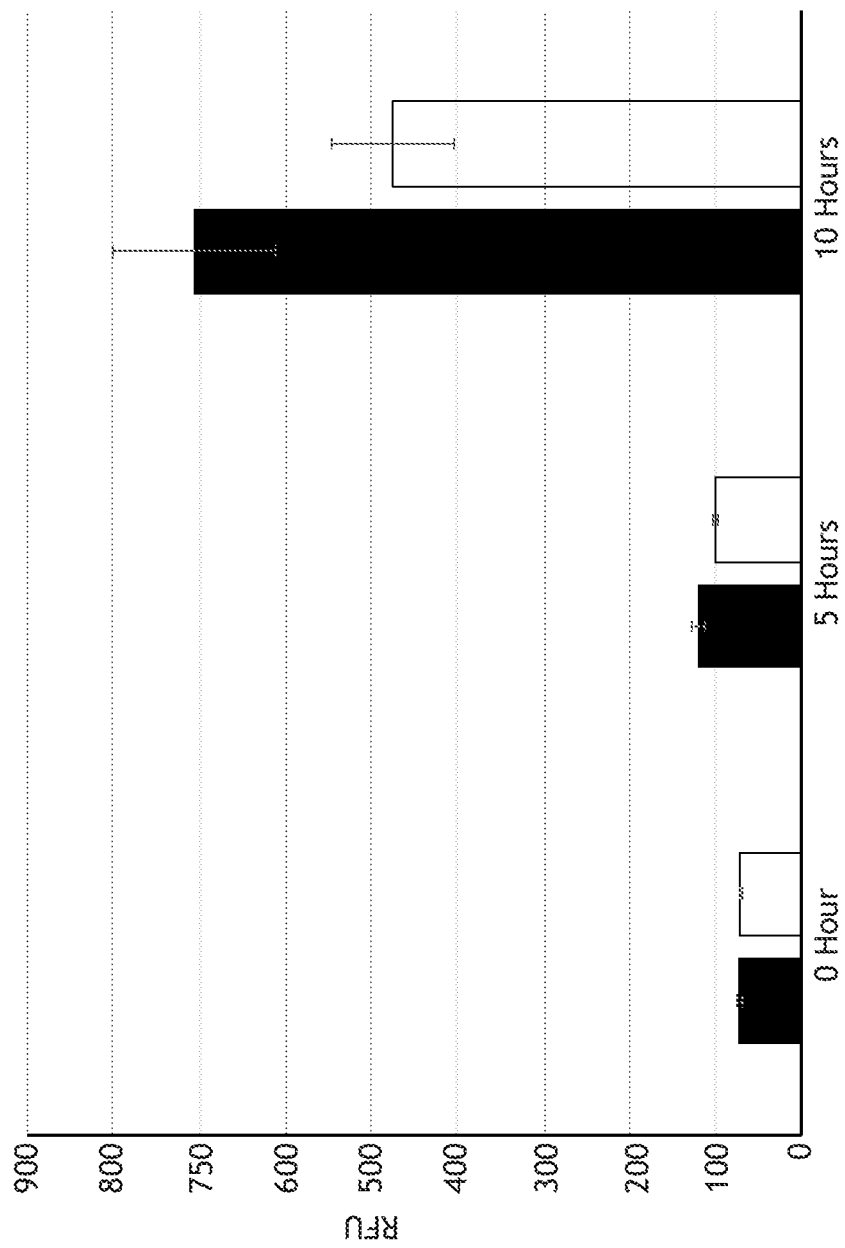
FIG. 13C is a graph illustrating the production of reactive oxygen species in *C. subellipsoidea* cultures in the presence of rotenone and oligomycin, in accordance with one or more embodiments of the present disclosure.
Figure 13D:
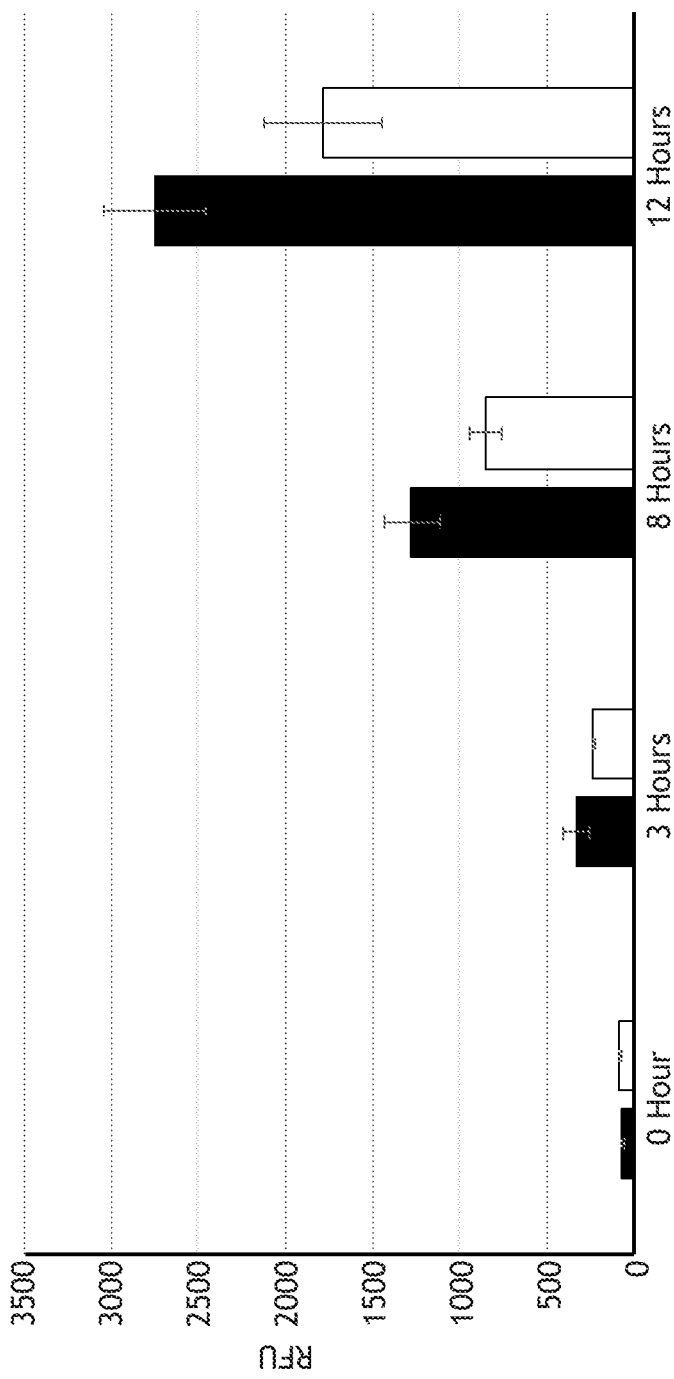
FIG. 13D is a graph illustrating the production of reactive oxygen species in *C. subellipsoidea* cultures in the presence of NAC, in accordance with one or more embodiments of the present disclosure.

Photosystem II Production of ROS Catalyzes Organophosphate Hydrolysis in Light Dependent Conditions The light dependence of paraoxon hydrolysis was further addressed using actively growing cultures of C. subellipsoidea that were heat treated at 100° C. for 10 min followed by paraoxon addition (f.c., 0.25 mg/mL) and incubation for 48 h under light at room temperature, as seen in FIGS. 11C-11D. The amount of paraoxon was directly measured spectrophotometrically. Heat treatment at 100° C. denatures the cellular proteins including most catalytic enzymes while leaving the Photosystems intact, which are more heat stable and continue to function, including the production of ROS. Heat treatment increased paraoxon degradation after 24 h consistent with an active Photosystem II (e.g., as seen in FIG. 11A). To ensure that these findings were not reflective of a heat-stable catalytic enzyme (e.g., an endogenous phosphotriesterase), cultures were treated at 100° C. for 10 min and incubated in either the dark or light for 12 h and paraoxon levels measured (FIG. 11C). The heat-treated samples in the dark that did not have light-dependent contribution to Photosystem II and were unable to degrade paraoxon. In contrast, samples that were heat-treated and kept in the light degraded paraoxon. These findings suggest no heat stable enzyme contributed to this activity and after heat-treatment, hydrolysis was dependent on Photosystem II and the production of ROS in the presence of light.

To explore these findings further, samples were prepared and heat-treated as noted above and used directly (control, non-oxidized) or allowed for oxidize for 12 h as noted by the loss of the green pigment. Paraoxon was added to 0.25 mg/mL (f.c.) with the samples kept in the light and the production of p-nitrophenol monitored at 24 h and 48 h (FIG. 11C). These data showed that paraoxon was rapidly degraded in the non-oxidized samples consistent with this being a light dependent reaction in the presence of a functional Photosystem II. These data supported the conclusion that the hydrolysis of paraoxon in the presence of light was dependent on the ROS produced by Photosystem II.

Using a chemical approach to confirm the role of ROS in the hydrolysis of organophosphates, actively growing cultures of *C. subellipsoidea* were first treated with DCMU and paraoxon in the light as detailed above, which produced conditions that blocked hydrolysis (FIG. 12A). Then N-acetylcysteine (NAC) was added (f.c. 20 μg/mL) as an antioxidant, mitochondrial ROS production was stimulated resulting in paraoxon hydrolysis, despite Photosystem II being inactivated (FIG. 12B). While not photocatalytic, these data show that ROS is essential for the breakdown of paraoxon under catabolic conditions.

Example VIII

Hydrolysis of Paraoxon can be Catalyzed by Mitochondrial ROS Production

To confirm that mitochondrial ROS production can contribute to paraoxon hydrolysis, actively growing cultures of *C. subellipsoidea* were treated with paraoxon (f.c., 0.25 mg/mL), oligomycin (f.c., 20 μg/mL) and rotenone (f.c., 20 μg/mL) and incubated in the dark for 48 h. Samples were taken at 12 h, 24 h and 48 h, cells removed by centrifugation and the among of p-nitrophenol determined in the supernatants. Oligomycin and rotenone inactivate mitochondrial complexes 1 and 4, respectively and thus eliminate ROS production. When Complexes 1 and 4 are blocked in the dark, paraoxon is not hydrolyzed into p-nitrophenol (FIG. 12C). These data show there is light independent hydrolysis of paraoxon, which, in this case, uses ROS as a byproduct of catabolic metabolism.

Example IX

Assessment of ROS Production on Paraoxon

To determine the effect of ROS production on paraoxon in vitro, 5 ml of BBM was added to 1.27 mg paraoxon in a test tube. Tubes were then treated with peroxide (100 uL/ml), ferrous sulfate (1 granule), or Rose Bengal (0.5 μL) to generate peroxide, and hydroxyl radicals respectively. After 5 min absorbance was read at 280 nm to detect the presence of paraoxon. An example of the ability of hydroxyl radicals and peroxides to hydrolyze paraoxon is seen in FIG. 13A.

To determine the effect of ROS production on paraoxon in vivo, 4 ml of BBM were added to 1 ml of C-169 culture resulting in a final average of OD 0.075. Samples were then treated as stated in previous methods. Following this, samples were placed into a 96 well plate and H4DFFDA, a fluorescent intracellular indicator of reactive oxygen species, was added to a final concentration of 10 μM in the assay and was allowed to incubate in limited light condition for one hour to allow for loading of the cells. Following this samples were measured at 600 nm, and fluorescence was measured using an excitation wavelength of 480 nm and read at 520 nm using a plate reader. Measurements were taken at time points 0 h, 5 h, 10 h post treatment. For example, FIG. 13B shows ROS production in an algal sample assayed by adding H4DFFDA to a 200 μl sample of *C. subellipsoidea* cultured in BBM media to a final concentration of 10 μL for 1 hour. Algal samples were treated by adding DCMU+NAC (patterned bars) or NAC alone (white bars) with untreated algal cells serving as a control (black bars). In another example, FIG. 13C shows ROS production assayed by adding H4DFFDA to a 5 ml cultures of C-169. Experimental groups were treated with Rotenone, Oligomycin, and absence of light (grey bars) and *C. subellipsoidea* cultures served as a control (black bars). Data shown is representative of an average of biological replicates n=5. In another example, FIG. 13D shows NAC added to a concentration of 2 mg/ml to cultures containing H4DFFDA in concentrations of 10 μM and ROS production assayed over time by excitation of 480 nm and emission of 520 nm.

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in another embodiment, one or more of the steps may be carried out as two or more sub-steps. Further, other steps or sub-steps may be carried out in addition to, or as substitutes to one or more of the steps disclosed herein.

The present disclosure has been illustrated in detail with reference to specific examples. It is to be noted that the examples should not be interpreted as a limitation of the present disclosure, but merely as an illustration.

What is claimed:

1. An algal photobioreactor system comprising:
a transparent tube configured to flow at least one of groundwater, surface water, or waste water;
an alga contained within the transparent tube;
one or more fibrous cords disposed within an internal volume of the transparent tube configured to bind the alga, wherein the alga removes a contaminant from the at least one of the groundwater, the surface water, or the waste water while the alga is bound to the one or more fibrous cords;
a pump configured to circulate at least one of the groundwater, the surface water, or the waste water through the transparent tube, wherein the alga to adheres to the one or more fibrous cords, and removes a contaminant from at least one of the groundwater, the surface water, or the waste water wherein a light source directs light through one or more portions of the transparent tube and onto the alga bound to the one or more fibrous cords.

2. The algal photobioreactor system of claim 1, wherein the contaminant comprises a nitrogenous compound.

3. The algal photobioreactor system of claim 2, wherein the nitrogenous compound comprises nitrogen-bound nitrate.

4. The algal photobioreactor system of claim 1, wherein the transparent tube is comprised of at least one of plastic or glass.

5. The algal photobioreactor system of claim 1, wherein the transparent tube comprises one or more recycled materials.

6. The algal photobioreactor system of claim 1, wherein the one or more fibrous cords comprises cotton.

7. The algal photobioreactor system of claim 1, wherein the contaminant comprises an organophosphate.

8. The algal photobioreactor system of claim 1, further comprising a diffuser configured to aerate the at least one of groundwater, surface water, or waste water, wherein the aeration of the at least one of the groundwater, surface water, or waste water increases growth of the alga upon the one or more fibrous cords.

9. A method of removing a contaminant from at least one of ground water, surface water, or waste water comprising:
providing contaminant-containing water from at least one of groundwater, surface water, or waste water sources;
adding the contaminant-containing water to an algal photobioreactor system, wherein the algal photobioreactor system comprises an alga bound to one or more fibrous cords within a transparent tube;
removing the contaminant from the contaminant-containing water while the alga is bound to the one or more fibrous cords;
adjusting at least one of a temperature, a $CO_2$ concentration, a pH, a light wavelength, an ion concentration or a light intensity in the algal photobioreactor system to enhance growth of the alga;
removing water from the algal photobioreactor system;
removing the one or more fibrous cords from the transparent tube; and
separating algal biomass from the one or more fibrous cords.

10. The method of claim 9, wherein the contaminant comprises a nitrogenous compound.

11. The method of claim 10, wherein the nitrogenous compound comprises nitrogen-bound nitrate.

12. The method of claim 9, further comprising a step of adjusting at least one of the temperature, the CO2 concentration, the pH, the light wavelength, the ion concentration, or the light intensity in the algal photobioreactor system to enhance lipid synthesis.

13. The method of claim 9, further comprising a step of extracting a substance from the algal biomass.

14. The method of claim 13, wherein the substance comprises at least one of a lipid, a protein, a carbohydrate, or a pigment.

15. The method of claim 9, wherein harvesting the algal biomass comprises:
removing the one or more fibrous cords from the algal photobioreactor system; and
separating the alga from the one or more fibrous cords.

16. The method of claim 15, wherein the one or more fibrous cords may be reused after the alga has been separated from the one or more fibrous cords.

17. The method of claim 9, wherein the contaminant comprises an organophosphate.

18. The method of claim 9, further comprising removing a contaminant from at least one of ground water, surface water, or waste water, further comprising aerating the at least one of groundwater, surface water, or waste water, wherein the aeration of the at least one of the groundwater, surface water, or waste water increases growth of the alga upon the one or more fibrous cords.

* * * * *